US012302042B2

United States Patent
Aoki et al.

(10) Patent No.: US 12,302,042 B2
(45) Date of Patent: May 13, 2025

(54) VIDEO PROJECTION METHOD AND VIDEO PROJECTION SYSTEM

(71) Applicant: Panasonic Intellectual Property Management Co., Ltd., Osaka (JP)

(72) Inventors: Asuka Aoki, Nara (JP); Yuan Xia, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 265 days.

(21) Appl. No.: 17/961,161

(22) Filed: Oct. 6, 2022

(65) Prior Publication Data

US 2023/0055067 A1 Feb. 23, 2023

Related U.S. Application Data

(63) Continuation of application No. PCT/JP2021/022504, filed on Jun. 14, 2021.

(30) Foreign Application Priority Data

Jun. 18, 2020 (JP) ................................. 2020-105526

(51) Int. Cl.
*H04N 9/31* (2006.01)
(52) U.S. Cl.
CPC ......... *H04N 9/3147* (2013.01); *H04N 9/3188* (2013.01); *H04N 9/3155* (2013.01)
(58) Field of Classification Search
CPC .. H04N 9/3105; H04N 9/3147; H04N 9/3155; H04N 9/3164; H04N 9/3182;
(Continued)

(56) References Cited

U.S. PATENT DOCUMENTS 5,988,817 A 11/1999 Mizushima et al.
10,754,237 B2* 8/2020 Kurota ................. H04N 9/3155
(Continued)

FOREIGN PATENT DOCUMENTS

JP 6-178327 6/1994
JP 6-303626 10/1994
(Continued)

OTHER PUBLICATIONS

International Search Report issued Aug. 31, 2021 in corresponding International Application No. PCT/JP2021/022504.

*Primary Examiner* — Sultan Chowdhury
(74) *Attorney, Agent, or Firm* — Wenderoth, Lind & Ponack, L.L.P.

(57) ABSTRACT

A video projection method of the present disclosure is a video projection method by a video projection system including a first projector, a second projector, and a controller that transmits video data to the first projector and the second projector. The first projector projects first projection video whose projection position moves in a first region based on the video data transmitted from the controller, the second projector projects second projection video onto a second region based on the video data transmitted from the controller, and at least one of resolution and brightness of the first projection video is adjusted in a superimposed region where the first region and the second region overlap.

16 Claims, 26 Drawing Sheets

(58) Field of Classification Search
CPC .. H04N 9/3188; H04N 9/3194; G03B 21/147; G03B 21/208
See application file for complete search history.

(56) References Cited

U.S. PATENT DOCUMENTS

| | | | |
|---|---|---|---|
| 11,372,321 B2* | 6/2022 | Aizaki | ............... G03B 21/2013 |
| 2014/0104582 A1 | 4/2014 | Mori | |
| 2015/0029465 A1 | 1/2015 | Ishikawa et al. | |
| 2016/0094821 A1 | 3/2016 | Mori | |
| 2017/0214895 A1* | 7/2017 | Fujioka | ................ H04N 9/3147 |
| 2018/0018941 A1* | 1/2018 | Monden | ............... H04N 9/3179 |
| 2019/0281266 A1 | 9/2019 | Urano | |
| 2020/0275067 A1* | 8/2020 | Naito | .................. H04N 9/3155 |
| 2020/0393750 A1 | 12/2020 | Ida et al. | |
| 2021/0063861 A1* | 3/2021 | Okino | .................. H04N 9/3147 |

FOREIGN PATENT DOCUMENTS

| | | |
|---|---|---|
| JP | 10-301202 | 11/1998 |
| JP | 2006-153952 | 6/2006 |
| JP | 2014-78872 | 5/2014 |
| JP | 2015-26992 | 2/2015 |
| JP | 2016-65995 | 4/2016 |
| JP | 2019-47355 | 3/2019 |
| JP | 2019-161397 | 9/2019 |
| WO | 2017/154609 | 9/2017 |

* cited by examiner

FIG. 2A
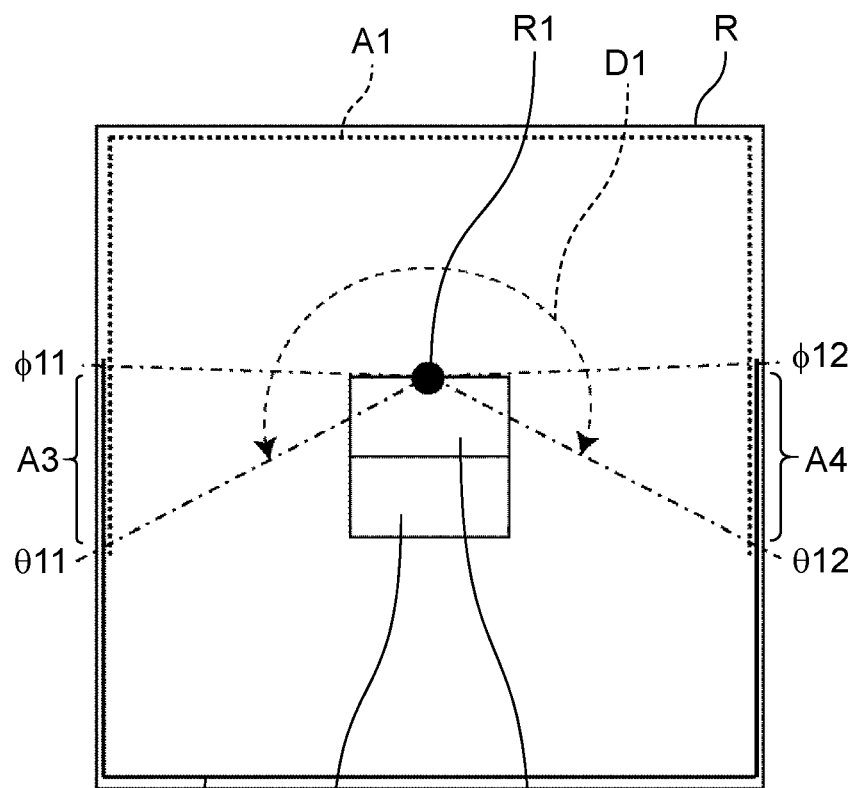
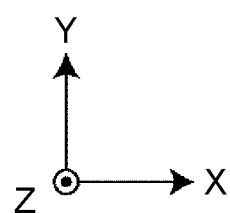

FIG. 3B

| GLOBAL PROJECTION ANGLE | FIRST PROJECTION ANGLE | SECOND PROJECTION ANGLE |
|---|---|---|
| 0° | 20° | 200° |
| ⋮ | ⋮ | ⋮ |
| 20°(380°) | 40°(ϕ12) | 220°(θ22) |
| ⋮ | ⋮ | ⋮ |
| 90° | 110° | N/A |
| ⋮ | ⋮ | ⋮ |
| 160° | 180°(ϕ11) | 0°(θ21) |
| ⋮ | ⋮ | ⋮ |
| 180° | 200° | 20° |
| ⋮ | ⋮ | ⋮ |
| 200° | 220°(θ11) | 40°(ϕ21) |
| ⋮ | ⋮ | ⋮ |
| 270° | N/A | 110° |
| ⋮ | ⋮ | ⋮ |
| 340°(−20°) | 0°(θ12) | 180°(ϕ22) |
| ⋮ | ⋮ | ⋮ |
| 360°(0°) | 20° | 200° |

FIG. 7

| FIRST PROJECTION ANGLE (DEGREES) | BRIGHTNESS | PROJECTION TRANSFORMATION MATRIX |
|---|---|---|
| 0° | 0% | $\begin{bmatrix} a0 & b0 & c0 \\ d0 & e0 & f0 \\ g0 & h0 & i0 \end{bmatrix}$ |
| 1° | 5% | $\begin{bmatrix} a1 & b1 & c1 \\ d1 & e1 & f1 \\ g1 & h1 & i1 \end{bmatrix}$ |
| ⋮ | ⋮ | ⋮ |
| 40° | 100% | $\begin{bmatrix} a40 & b40 & c40 \\ d40 & e40 & f40 \\ g40 & h40 & i40 \end{bmatrix}$ |
| ⋮ | ⋮ | ⋮ |
| 110° | 100% | NONE |
| ⋮ | ⋮ | ⋮ |
| 180° | 100% | $\begin{bmatrix} a180 & b180 & c180 \\ d180 & e180 & f180 \\ g180 & h180 & i180 \end{bmatrix}$ |
| ⋮ | ⋮ | ⋮ |
| 220° | 0% | $\begin{bmatrix} a220 & b220 & c220 \\ d220 & e220 & f220 \\ g220 & h220 & i220 \end{bmatrix}$ |

FIG. 9

| TIME (hh:mm) | GLOBAL PROJECTION ANGLE (DEGREES) | CONTENT |
|---|---|---|
| 00:00 | θg1 | C1 |
| 00:01 | θg2 | C1 |
| ⋮ | ⋮ | ⋮ |
| 00:nn | θgn | C2 |
| ⋮ | ⋮ | ⋮ |

FIG. 15
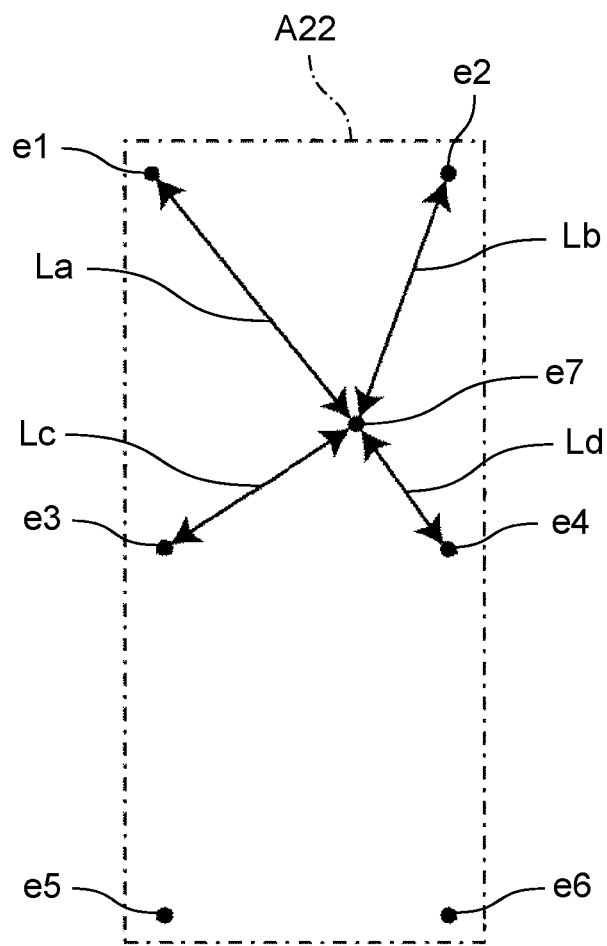
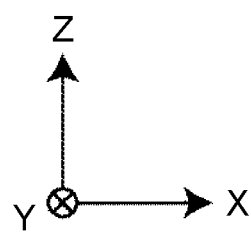

FIG. 19A

| FIRST PROJECTION ANGLE | RESOLUTION (OR BRIGHTNESS) OF VIDEO BY FIRST PROJECTOR | BRIGHTNESS OF VIDEO BY SECOND PROJECTOR (SUPERIMPOSED PART) | PROJECTION TRANSFORMATION MATRIX |
|---|---|---|---|
| θ11 ⋮ θ31 | 100% | 100% | (NONE) |
| θ32 θ33 ⋮ θ34 θ35 | 16% | 0% | $\begin{bmatrix} a\theta & b\theta & c\theta \\ d\theta & e\theta & f\theta \\ g\theta & h\theta & j\theta \end{bmatrix}$ |
| θ36 ⋮ θ12 | 100% | 100% | (NONE) |

VIDEO PROJECTION METHOD AND VIDEO PROJECTION SYSTEM

BACKGROUND

1. Technical Field

The present disclosure relates to a video projection method and a video projection system.

2. Description of the Related Art

The control device described in Patent Literature (PTL) 1 includes a plurality of projection devices and an imaging device, and the imaging device captures a marker image projected by the projection device. The plurality of projection devices can be aligned based on a captured image including a marker image acquired by the imaging device.

PTL 1 is Unexamined Japanese Patent Publication No. 2019-161397.

SUMMARY

The present disclosure provides a video projection method and a video projection system that display, without giving a feeling of strangeness, video whose projection position moves in a case where video is projected by a projector that projects video whose projection position moves.

A video projection method according to a first aspect of the present disclosure is a video projection method by a video projection system including a first projector, a second projector, and a controller that transmits video data to the first projector and the second projector. The first projector projects first projection video whose projection position moves in a first region based on the video data transmitted from the controller, the second projector projects second projection video onto a second region based on the video data transmitted from the controller, and at least one of resolution and brightness of the first projection video is adjusted in a superimposed region where the first region and the second region overlap.

A video projection method according to a second aspect of the present disclosure is a video projection method by a projector having a mechanism for moving a projection position of projection video to be projected. When a movement direction of a projection position of the projection video is reversed by reversing of a driving direction of the mechanism, a display position of a predetermined image in the projection video is moved in the movement direction with respect to the projection video in response to a speed at which the projection position moves.

A video projection system according to the present disclosure includes the first projector that projects first projection video whose projection position moves in a first region, the second projector that projects second projection video in a second region, and the controller that transmits video data to the first projector and the second projector. The controller adjusts at least one of resolution and brightness of the video data of the first projection video in a superimposed region where the first region and the second region overlap.

According to the present disclosure, it is possible to provide a video projection method and a video projection system that display, without giving a feeling of strangeness, video whose projection position moves in a case where video is projected by a projector that projects video whose projection position moves.

BRIEF DESCRIPTION OF THE DRAWINGS

FIG. 2A is a view illustrating a region associated with the first projector of the video projection system of FIG. 1.

FIG. 3B is a view illustrating a mapping table of the global projection angle, the first projection angle, and the second projection angle.

FIG. 7 is a view illustrating an example of a correction table in the video projection system of FIG. 1.

FIG. 9 is a view illustrating an example of a timetable used in the video projection system of FIG. 1.

FIG. 15 is a view explaining a calculation method of cursor coordinates in the superimposed region of FIG. 14.

FIG. 19A is a view illustrating a first example for defining a correction table in the video projection system of FIG. 16.

DETAILED DESCRIPTION

Background to Invention

Figure 1:
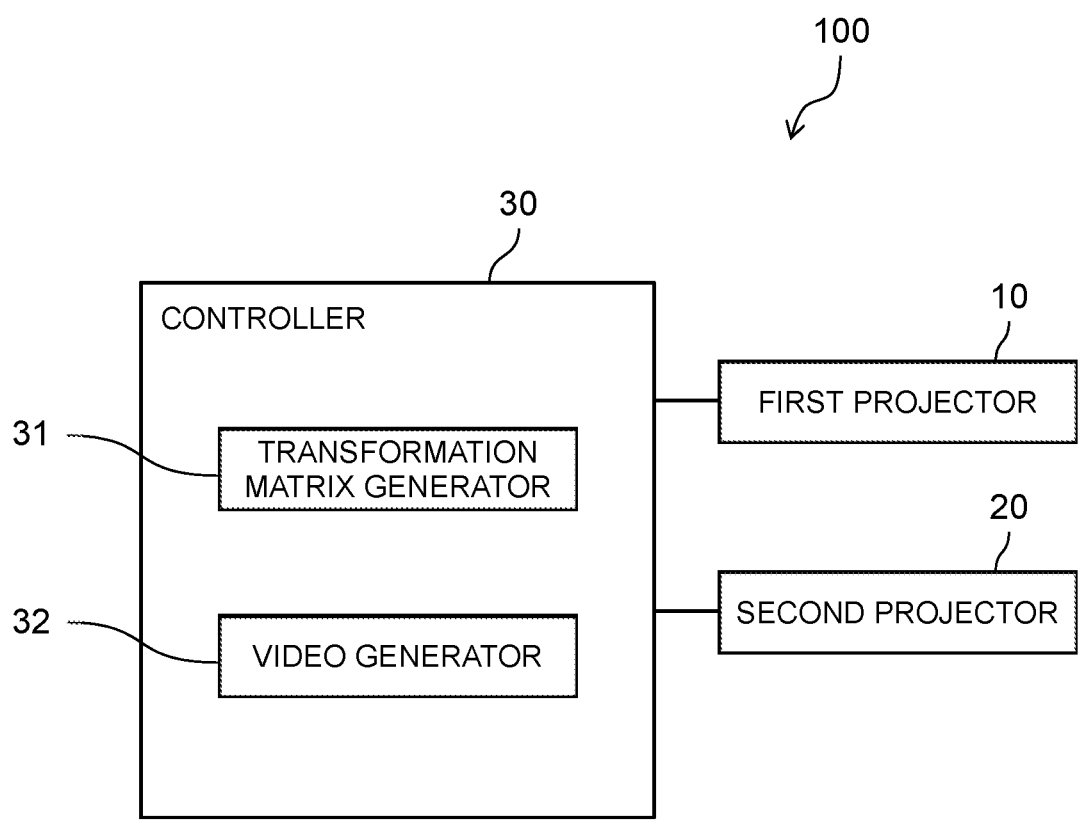
FIG. 1 is a block diagram illustrating a configuration of a video projection system according to a first exemplary embodiment.

A projector capable of moving a projection position of video is known. For movement of the projection position of video, a method of moving the projection position of video projected from a projector by a moving mirror, and a method of moving the projector itself using a moving projector to move the projection position of video are studied.

Furthermore, use of a plurality of moving mirrors or a moving projector makes it possible to move the projection position of video in a wider range. In this case, at the joint of projection regions of pieces of video by the plurality of projectors, due to a reason that the shapes of video projected from the projectors do not coincide with one another, or a reason that a part projected by two projectors becomes brighter than a part projected by one projector, there is a problem that smooth switching of video among the projectors is not possible, and a person viewing the video has a feeling of strangeness.

Therefore, the inventors of the present invention have studied a method of improving alignment accuracy in a case of projecting video using a plurality of moving mirrors or a moving projector, and have reached the following invention.

A video projection method according to one aspect of the present disclosure is a video projection method of a plurality of projectors including a first projector capable of moving a projection position of video in a first region and a second projector capable of moving a projection position of video in a second region partially overlapping the first region, in which a projection transformation matrix for transforming a coordinate system of a projection position of video of the first projector in accordance with a projection position of video of the second projector in a superimposed region where the first region and the second region overlap is generated, video is projected from the first projector to a projection position based on a coordinate system of the first projector in a region of the first region not overlapping the second region, video is projected from the second projector to a projection position based on a coordinate system of the second projector in the superimposed region, and the first projector projects video to a projection position based on a coordinate system transformed based on the projection transformation matrix.

According to this configuration, in a case of projecting video by a plurality of projectors capable of moving a projection position, it is possible to improve alignment accuracy.

The projection position of video by the first projector may be determined by the first projection angle, the projection position of video by the second projector may be determined by the second projection angle, and the superimposed region may be set by angle information in which the first projection angle and the second projection angle are correlated.

According to this configuration, by using the angle information in which the first projection angle and the second projection angle are correlated, it is possible to perform processing such that video of the first projector and video of the second projector are joined without giving a feeling of strangeness in the superimposed region.

The correlated angle information may be a global projection angle including the first projection angle and the second projection angle.

This configuration makes it possible to control the first projector and the second projector by one coordinate system. Therefore, it is possible to smoothly switch between the first projector and the second projector.

Video may be generated so as to lower the brightness of at least any one of the video by the first projector and the video by the second projector in the superimposed region.

According to this projection method, it is possible to match the brightness of video projected to the superimposed region with the brightness of video projected to the first region and the second region other than the superimposed region, and therefore, it is possible to project video without giving a feeling of strangeness even in the superimposed region.

The projection transformation matrix may be generated based on coordinate information in the coordinate system of the first projector when the video displayed in the superimposed region by the first projector is superimposed on the video displayed in the superimposed region by the second projector.

According to this configuration, an imaging device or the like is not used, and therefore the system configuration can be simplified.

When one projector of the first projector and the second projector is projecting video, the projection angle of the other projector may be changed in accordance with the projection angle of the one projector.

According to this configuration, in a case of moving the projection position of video at a high speed, it is possible to smoothly perform switching between the first projector and the second projector.

When one projector of the first projector and the second projector is projecting video, the moving speed of the other projector may be changed in accordance with the moving speed of the one projector.

According to this configuration, the moving speed of the projection position of video by the other projector can be adjusted in accordance with the moving speed of the projection position of video of the one projector. Therefore, even in a case where the moving speed of one projector is high, it is possible to project video without giving a feeling of strangeness when the projector is switched to the other projector.

A video projection system according to one aspect of the present disclosure includes: a plurality of projectors including a first projector capable of moving a projection position of video in a first region and a second projector capable of moving a projection position of video in a second region partially overlapping the first region; a transformation matrix generator that generates a projection transformation matrix for transforming a coordinate system of a projection position of video of the first projector in accordance with a projection position of video of the second projector in a superimposed region where the first region and the second region overlap; and a video generator that generates video to be projected by the first projector and the second projector, in which the first projector projects video generated by the video generator to a projection position based on a coordinate system of the first projector in a region of the first region not overlapping the second region, the second projector projects video generated by the video generator to a projection position based on a coordinate system of the second projector in the superimposed region, and the first projector projects video generated by the video generator to a projection position based on the projection transformation matrix generated by the transformation matrix generator.

According to this configuration, in a case of projecting video by a plurality of projectors capable of moving a projection position, it is possible to improve alignment accuracy.

Exemplary embodiments will be described below with reference to the drawings.

First Exemplary Embodiment

Overall Configuration

Figure 2B:
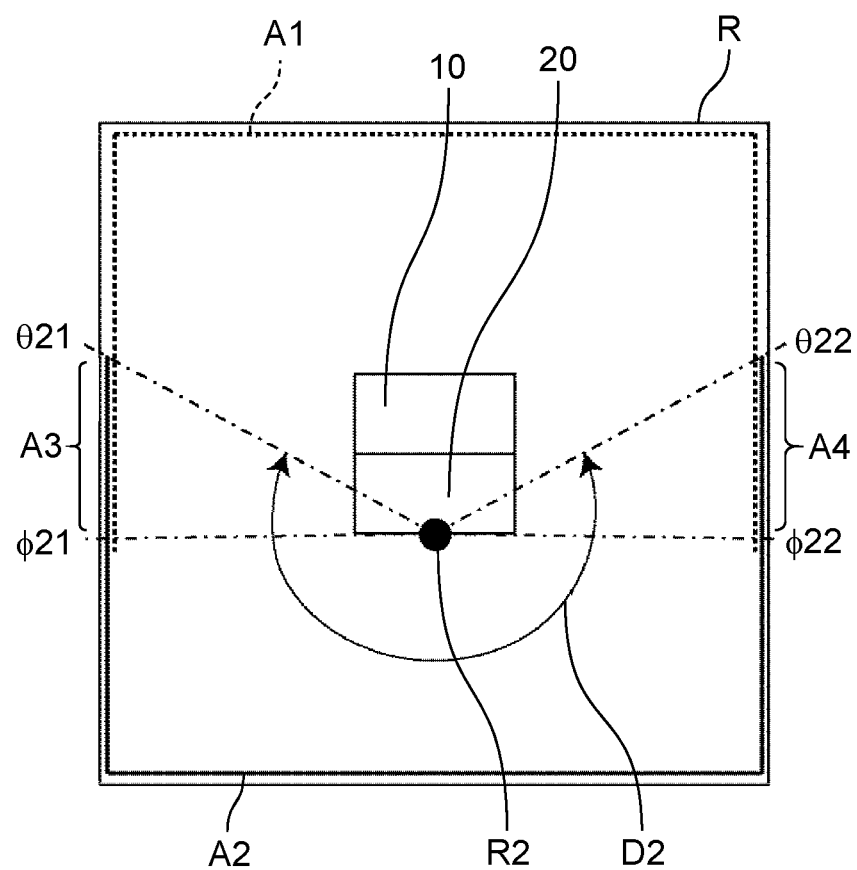
FIG. 2B is a view illustrating a region associated with the second projector of the video projection system of FIG. 1.
Figure 3A:
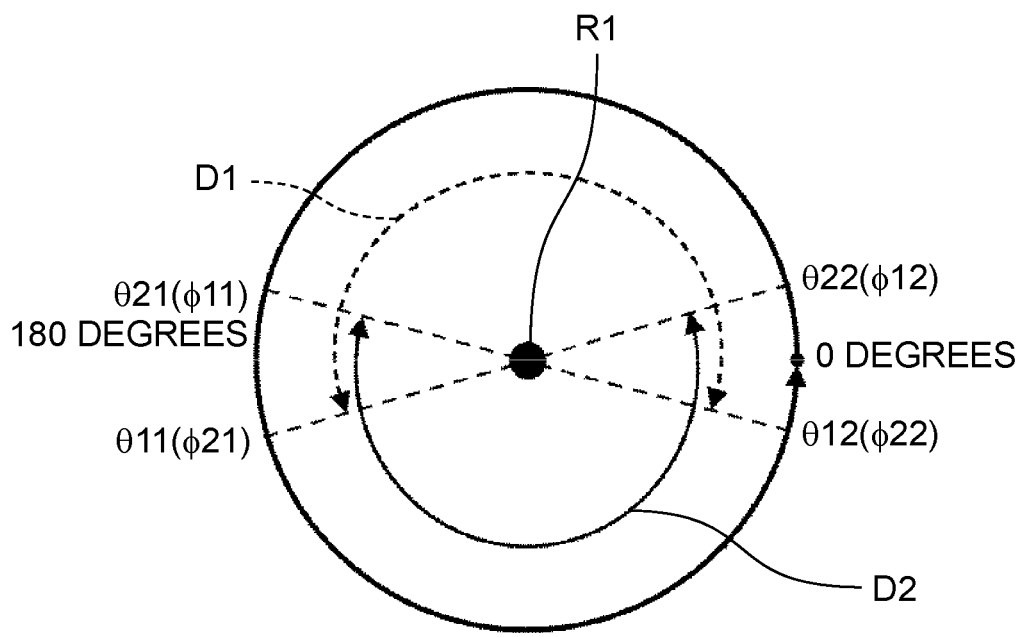
FIG. 3A is a view illustrating a relationship among a global projection angle, a first projection angle, and a second projection angle in the video projection system of FIG. 1.
Figure 4:
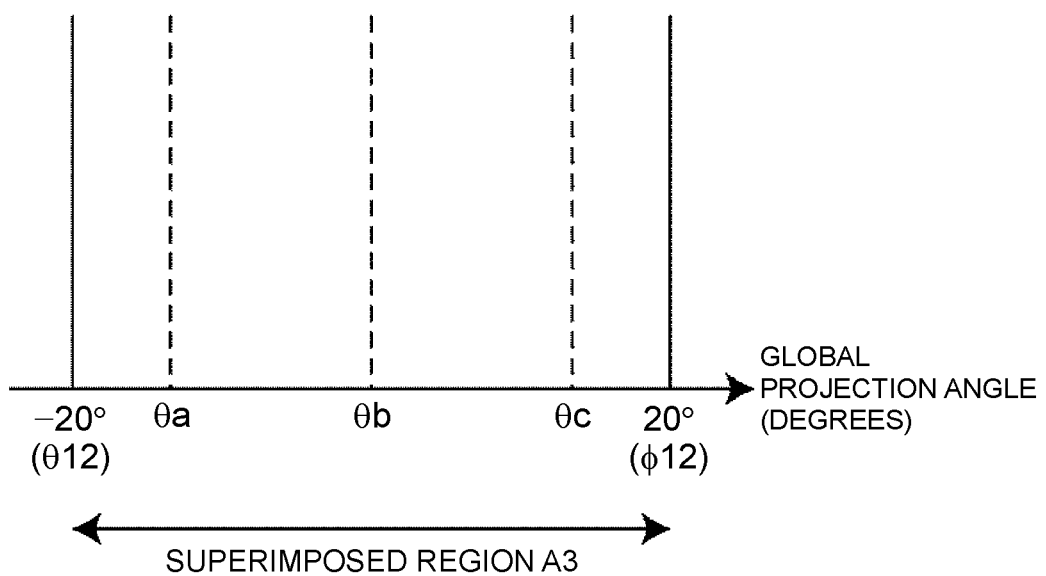
FIG. 4 is a view illustrating calibration points in a superimposed region A3.
Figure 5A:
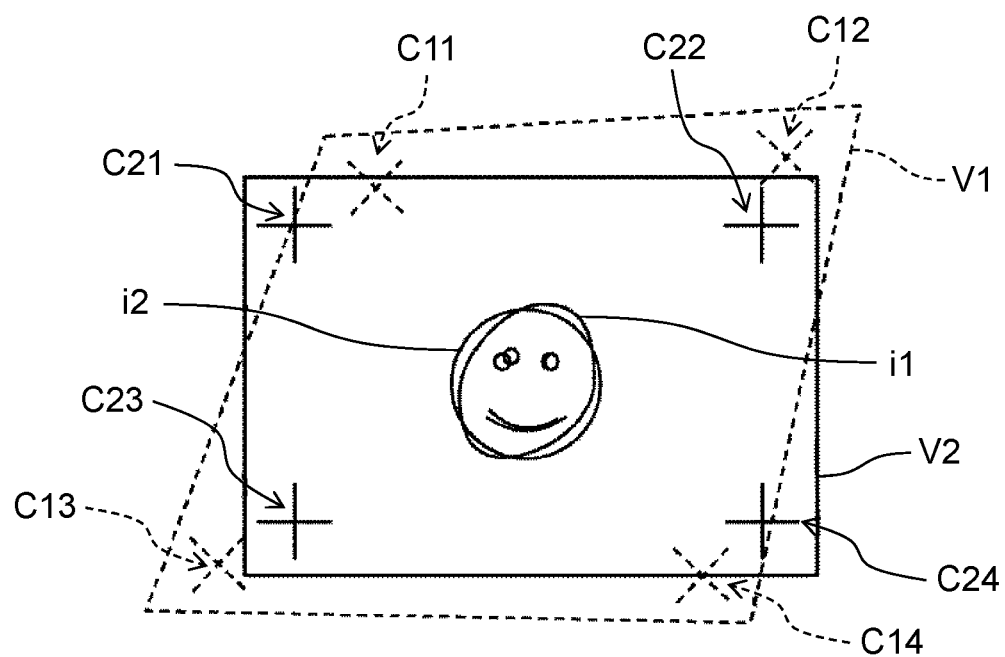
FIG. 5A is a view explaining alignment at a calibration point.
Figure 5B:
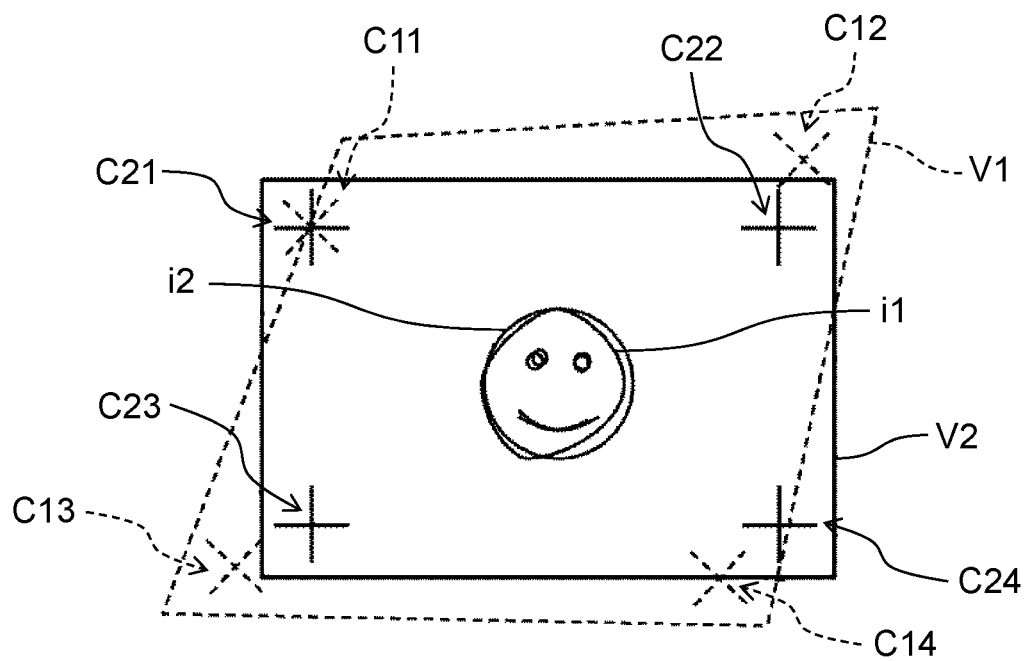
FIG. 5B is a view explaining alignment at a calibration point.
Figure 5C:
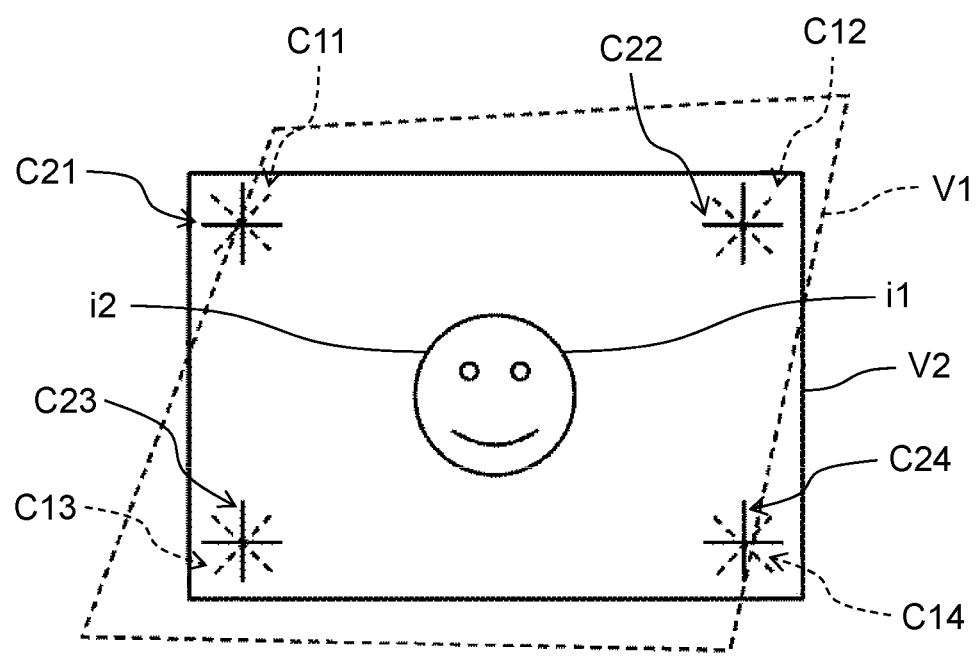
FIG. 5C is a view explaining alignment at a calibration point.
Figure 6:
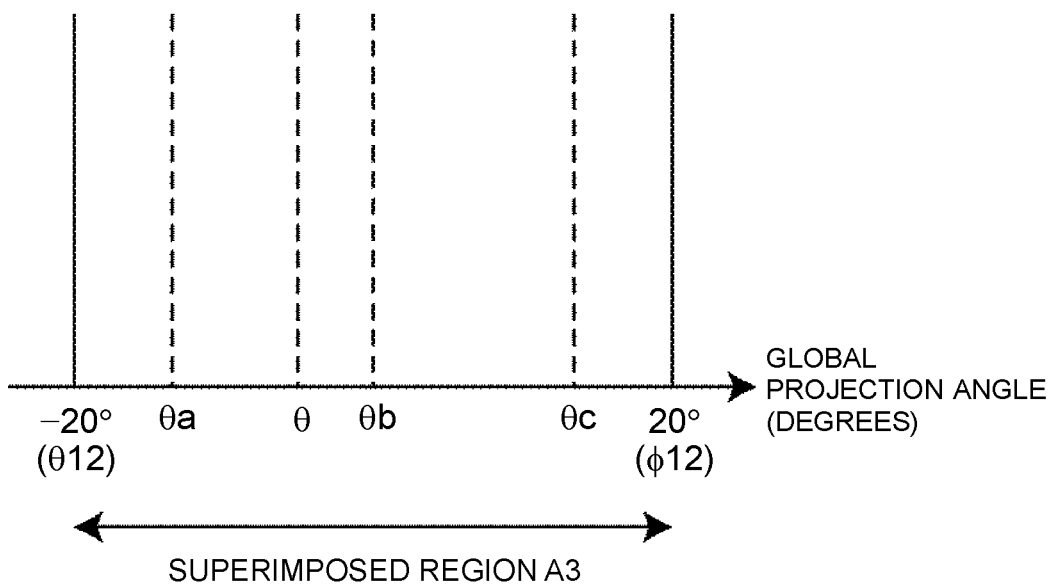
FIG. 6 is a view explaining a calculation method of cursor coordinates at points other than calibration points.
Figure 8:
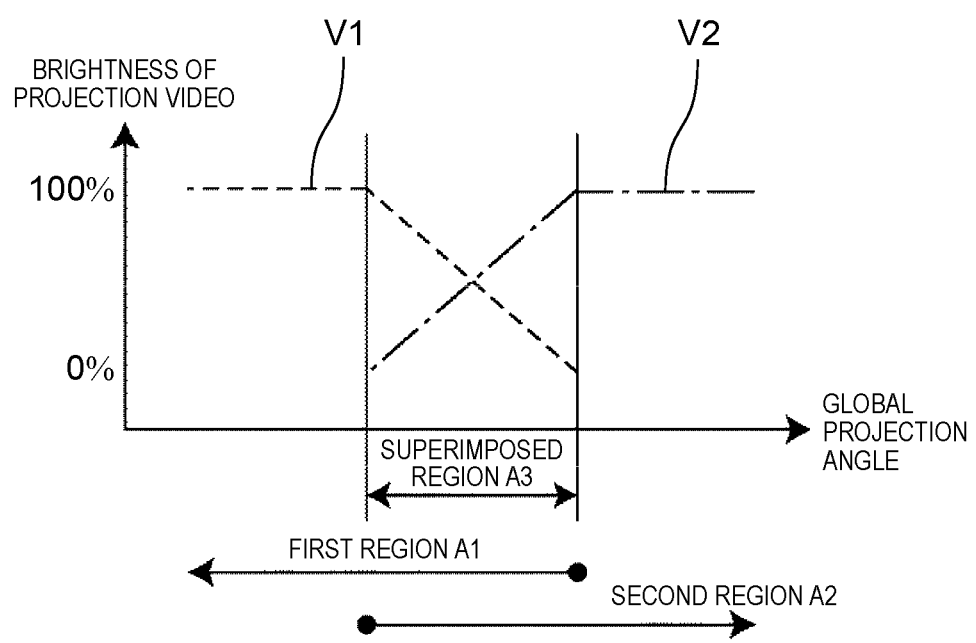
FIG. 8 is a view illustrating brightness of video in the superimposed region of FIG. 1.

FIG. 1 is a block diagram illustrating a configuration of video projection system 100 according to the first exemplary embodiment of the present disclosure. FIG. 2A is a view illustrating a region associated with first projector 10 of video projection system 100 of FIG. 1. FIG. 2B is a view illustrating a region associated with second projector 20 of video projection system 100 of FIG. 1. FIG. 3A is a view illustrating a relationship among the global projection angle, the first projection angle, and the second projection angle in video projection system 100 of FIG. 1. FIG. 3B is a view illustrating a mapping table of the global projection angle, the first projection angle, and the second projection angle. FIG. 4 is a view illustrating calibration points θa to θc in superimposed region A3. FIGS. 5A to 5C are views explaining alignment at calibration points θa to θc. FIG. 6 is a view explaining the calculation method of the cursor coordinates at points other than calibration points θa to θc. FIG. 7 is a view illustrating an example of a correction table in video projection system 100 of FIG. 1. FIG. 8 is a view illustrating brightness of video in superimposed region A3 of FIG. 1. FIG. 9 is a view illustrating an example of a timetable used in video projection system 100 of FIG. 1.

As illustrated in FIG. 1, video projection system 100 includes first projector 10, second projector 20, and controller 30.

Projector

Video projection system 100 includes a plurality of projectors including first projector 10 and second projector 20. In the present exemplary embodiment, an example in which video projection system 100 includes two projectors, first projector 10 and second projector 20, will be described.

First projector 10 and second projector 20 are devices that project, through a projection lens, video generated based on an input video signal. First projector 10 and second projector 20 can transmit and receive data or information such as a video signal to and from controller 30 described later. First projector 10 and second projector 20 generate video based on a video signal input from controller 30, and output projection light (for example, visible light) to be projected onto a projection surface such as a screen or a wall.

First projector 10 and second projector 20 can move the projection position of video by varying the projection direction of video. As the configuration for varying the projection position of video, for example, a configuration (mechanism for driving the moving mirror) for changing a mirror (moving mirror) that reflects video (projection light) and an angle of the mirror may be adopted. A configuration of moving (for example, rotating) first projector 10 and second projector 20 themselves may be adopted.

Each of first projector 10 and second projector 20 is disposed at a position where projection light can be output toward a projection surface such as a wall surface or a screen. In the present exemplary embodiment, as illustrated in FIGS. 2A and 2B, first projector 10 and second projector 20 are arranged back to back at the center of a space surrounded by walls on four sides, and project video onto a wall as a projection surface. Note that FIGS. 2A and 2B are views of room R surrounded by walls on four sides as viewed from above. By arranging first projector 10 and second projector 20 back to back, first projector 10 and second projector 20 can move the projection positions of video so as to compensate for blind spots of each other.

Specifically, as illustrated in FIG. 2A, first projector 10 can move the projection position of video within range D1 from angle θ11 to angle θ12 by rotating the projection direction of projection light about rotation shaft R1 in the Z-direction. In the present exemplary embodiment, the projection direction of projection light of first projector 10 is a first projection angle, and the first projection angle is indicated by angles θ11 to θ12. The projection position of video by first projector 10 is determined by the first projection angle. Note that range D1 can be discretionarily set depending on the distance to the projection surface, the size of the projection surface, and the like. The range in which video is projected by first projector 10 is first region A1 indicated by broken lines in FIGS. 2A and 2B. First region A1 is defined by the first projection angle described above.

Similarly, as illustrated in FIG. 2B, second projector 20 can move the projection position of video within range D2 from angle θ21 to angle θ22 by rotating the projection direction of projection light about rotation shaft R2 in the Z-direction. In the present exemplary embodiment, the projection direction of projection light by second projector 20 is a second projection angle, and the second projection angle is indicated by angles θ21 to θ22. The projection position of video by second projector 20 is determined by the second projection angle. Note that range D2 can be discretionarily set depending on the distance to the projection surface, the size of the projection surface, and the like. The range in which video is projected by second projector 20 is second region A2 indicated by solid lines in FIGS. 2A and 2B. Second region A2 is defined by the second projection angle described above.

As illustrated in FIGS. 2A and 2B, first region A1 in first projector 10 and second region A2 in second projector 20 partially overlap each other. That is, first region A1 and second region A2 have superimposed regions A3, A4 that are overlapping regions.

Thus, when first projector 10 and second projector 20 are arranged back to back, second projector 20 can project video to a position that is a blind spot of first projector 10. Conversely, first projector 10 can project video to a position that is a blind spot of second projector 20. Therefore, in the present exemplary embodiment, as illustrated in FIGS. 2A and 2B, it is possible to project video on all wall surfaces in a room surrounded by walls on four sides.

First projector 10 projects video while moving the projection position of video in first region A1, and second projector 20 projects video while moving the projection position of video in second region A2. Therefore, first projector 10 and second projector 20 project video using different coordinate systems.

In superimposed regions A3, A4, video of each of projectors 10, 20 is projected in an overlapping manner. At this time, angle information in which the first projection angle and the second projection angle are correlated is used so that the coordinate systems of first projector 10 and second projector 20 can be collectively handled. Angle information in which the first projection angle and the second projection angle are correlated is a global projection angle including the first projection angle and the second projection angle.

As illustrated in FIG. 3A, the global projection angle is defined in a range including the first projection angle and the second projection angle. Rotation shaft R1 serving as a reference of the first projection angle of first projector 10 is different from rotation shaft R2 serving as a reference of the second projection angle of second projector 20. Therefore, use of the global projection angle enables each of the first projection angle and the second projection angle to be expressed by common rotation shaft R3. In the present exemplary embodiment, the global projection angle is defined in a range of 0 degrees to 360 degrees.

As illustrated in FIG. 3B, by creating a mapping table of the global projection angle, the first projection angle, and the second projection angle, video by first projector 10 and video by second projector 20 can be projected in one coordinate system.

In the present exemplary embodiment, as illustrated in FIGS. 3A and 3B, the first projection angle is range D1 of angles θ12 to θ11, and is a range from 340 degrees (−20 degrees) to 200 degrees when mapped to the global projection angle. According to the first projection angle, first region A1 is represented by 0 degrees (angle θ12) to 220 degrees (angle θ11), superimposed region A3 is represented by 180 degrees (angle φ11) to 220 degrees (angle θ11), and superimposed region A4 is represented by 0 degrees (angle θ12) to 40 degrees (angle φ12). On the other hand, according to the global projection angle, first region A1 is represented by 340 degrees (−20 degrees) to 200 degrees, superimposed region A3 is represented by 160 degrees to 200 degrees, and superimposed region A4 is represented by 340 degrees (−20 degrees) to 20 degrees.

Similarly, the second projection angle is range D2 of angles θ21 to θ22, and is a range from 160 degrees to 20 degrees (380 degrees) when mapped to the global projection angle. According to the second projection angle, second region A2 is represented by 0 degrees (θ21) to 220 degrees (θ22), superimposed region A3 is represented by 0 degrees (angle θ21) to 40 degrees (angle φ21), and superimposed region A4 is represented by 180 degrees (angle φ22) to 220 degrees (angle θ22). According to the global projection angle, second region A2 is represented by 160 degrees to 20 degrees (380 degrees).

First region A1, defined by the first projection angle, second region A2, defined by the second projection angle, superimposed regions A3, A4, and the global projection angle are set in advance depending on the distance to the projection surface, the size of the projection surface, and the like.

Controller

As illustrated in FIG. 1, controller 30 controls projection of video by first and second projectors 10, 20. In the present exemplary embodiment, controller 30 has transformation matrix generator 31 and video generator 32.

Controller 30 includes a general-purpose processor such as a CPU or an MPU that implements a predetermined function by executing a program. Controller 30 implements the functions of transformation matrix generator 31 and video generator 32 by calling and executing a control program stored in a storage not illustrated. Controller 30 is not limited to one that implements a predetermined function by cooperation of hardware and software, and may be a hardware circuit designed exclusively for implementing a predetermined function. That is, controller 30 can be implemented by various processors such as a CPU, an MPU, a GPU, an FPGA, a DSP, and an ASIC.

The controller can be mounted on an electronic device such as a PC. Alternatively, some functions of the controller may be mounted on first projector 10 and second projector 20.

Transformation Matrix Generator

Transformation matrix generator 31 generates a projection transformation matrix for transforming the coordinate system of the projection position of first projector 10 in accordance with the projection position of video by second projector 20 in superimposed regions A3, A4. A correction table is created based on the generated projection transformation matrix. The processing of transformation matrix generator 31 will be described in detail below.

In order to generate a projection transformation matrix, first, video by first projector 10 and video by second projector 20 are aligned at a point (calibration point) indicated by one or a plurality of projection angles of superimposed regions A3, A4. In the present exemplary embodiment, as illustrated in FIG. 4, in superimposed region A3 where the global projection angle ranges from −20 degrees to 20 degrees, alignment of video is performed at three calibration points θa, θb, and θc. Also, in superimposed region A4 where the global projection angle ranges from 160 degrees to 200 degrees, alignment of video is similarly performed at one or a plurality of calibration points.

Alignment of video is executed by, at each of calibration points θa, θb, and θc, projecting video V1 by first projector 10 and video V2 by second projector 20 in an overlapping manner, and adjusting the projection position of video V1 to match the projection position of video V2. Alignment of the projection position of video V1 to the projection position of video V2 can be executed by adjusting the position of, for example, one or a plurality of points included in video V1 in accordance with corresponding one or a plurality of points of video V2. The point may be a discretionary position of each of videos V1, V2, or may be a position serving as a feature point in each of videos V1, V2. For example, in a case where rectangular video is displayed, the point may be set as the four corners.

In the present exemplary embodiment, as illustrated in FIG. 5A, at calibration point θa of superimposed region A3, video V1 in which cursors C11 to C14 are displayed at four corners and video V2 in which cursors C21 to C24 are displayed at four corners are superimposed and projected. As illustrated in FIG. 5B, cursor C11 in video V1 is moved to match the positions of cursor C11 and cursor C21 in video V2. Similarly, cursors C12 to C14 in video V1 are also moved so as to match cursors C22 to C24 in video V2 (FIG. 5C). Note that the shape of the cursor is not limited to those in FIGS. 5A to 5C, and a cursor having the same shape may be used in video V1 and video V2.

By moving cursors C11 to C14 at the four corners of video V1, the shape of image i1 displayed at the center of video V1 changes, and the shape of image i1 displayed on video V1 approaches the shape of image i2 displayed on video V2. When cursors C11 to C14 of video V1 are moved to be aligned with video V2, image i1 displayed on video V1 and image i2 displayed on video V2 match as illustrated in FIG. 5C. By using the projection transformation matrix described later, in superimposed regions A3, A4, the coordinates of video V1 are transformed, and videos V1, V2 can be projected so that the positions, shapes, and sizes of videos V1, V2 coincide and overlap with each other. The coordinate information of moved cursors C11 to C14 is stored in the storage.

Similar alignment is performed at calibration points θb and θc. Furthermore, also in superimposed region A4, calibration points are similarly set, and alignment is performed at each calibration point.

A projection transformation matrix of each of superimposed regions A3, A4 is generated based on the coordinates before and after movement of cursors C11 to C14. At each of calibration points θa, θb, and θc, a 3×3 matrix is generated as a projection transformation matrix based on the coordinate information of cursors C11 to C14. In the following description, generation of a projection transformation matrix at a global projection angle other than calibration points θa, θb, and θc in superimposed region A3 will be described. Also in superimposed region A4, a projection transformation matrix at a global projection angle other than a calibration point can be similarly generated.

The projection transformation matrix at global projection angle θ other than calibration points θa, θb, and θc in superimposed region A3 illustrated in FIG. 6 may be obtained using the coordinate information of calibration points θa to θc having the closest projection angle. In the case of the example of FIG. 6, since the closest to global projection angle θ is calibration point θb, the projection transformation matrix at calibration point θb can be used.

Alternatively, the coordinate information of cursors C11 to C14 at global projection angle θ may be calculated, and the projection transformation matrix may be generated based on the coordinate information. For example, let the coordinates of cursor C11 at calibration point θa be (Xa, Ya), and the coordinates of cursor C11 at calibration point θb be (Xb, Yb). Coordinates (Xθ, Yθ) of cursor C11 at global projection angle θ are calculated by Mathematical formulae 1 and 2.

$$X\theta = Xa + (Xb - Xa)/(\theta b - \theta a) \times (\theta - \theta b)$$ [Mathematical formula 1]

$$Y\theta = Ya + (Yb - Ya)/(\theta b - \theta a) \times (\theta - \theta b)$$ [Mathematical formula 2]

The coordinates of cursors C12 to C14 at global projection angle θ may be similarly calculated, and the projection transformation matrix at global projection angle θ may be generated based on these coordinates.

In superimposed regions A3, A4, second projector 20 does not perform correction processing on video V2. On the other hand, distortion or the like of video V1 to be projected may occur with rotation of first projector 10 about rotation shaft R1. Also in second projector 20, distortion or the like of video V2 to be projected may similarly occur with rotation about rotation shaft R2. In this case, there is a case where, separately from correction in superimposed regions A3, A4, geometric correction processing is performed in advance in order to avoid distortion or the like of video. In this case, first projector 10 transforms the coordinates indicating the projection position by multiplying the transformation matrix for geometric correction to avoid distortion by the projection transformation matrices in superimposed regions A3, A4. In this case, second projector 20 also performs geometric correction for avoiding distortion.

The correction table illustrated in FIG. 7 is created based on the generated projection transformation matrix. The correction table is a table indicating a projection transformation matrix corresponding to the first projection angle of first projector 10. The global projection angle corresponding to the first projection angles can be obtained using the mapping table of each of the global projection angle, the first projection angle, and the second projection angle described with reference to FIG. 3B. Therefore, the projection transformation matrix at the above-described global projection angle can be made to correspond to the first projection angle. Note that the correction table may include coordinate information of cursors C11 to C14 at the projection angle instead of the projection transformation matrix. This is because the projection transformation matrix can be obtained as long as the coordinate information is present.

The projection transformation matrix generated by transformation matrix generator 31 is a matrix for matching video V1 by first projector 10 with video V2 by second projector 20 in superimposed regions A3, A4. Therefore, in the correction table of FIG. 7, the projection transformation matrix corresponding to the first projection angle indicating superimposed regions A3, A4 is illustrated. For example, in the table of FIG. 7, since a case where the first projection angle is 110 degrees is not included in superimposed regions A3, A4, the projection transformation matrix is "none".

In the correction table illustrated in FIG. 7, "brightness" is defined corresponding to the first projection angle. The brightness is a numerical value that determines lightness of video. In superimposed regions A3, A4, video V1 by first projector 10 and video V2 by second projector 20 are projected in an overlapping manner. Therefore, in superimposed regions A3, A4, the brightness of video V1 by first projector 10 and video V2 by second projector 20 is lowered. By lowering the brightness of video V1 and video V2, the brightness of the overlapped video can be made equal to the brightness of video V1 in first region A1 and the brightness of video V2 in second region A2.

The brightness of video is lightness of video generated by video generator 32 described later. For example, the brightness of video can be changed by adjusting a signal value of the video. In superimposed regions A3, A4, video generator 32 generates video such that brightness of video V1 and video V2 decreases.

As illustrated in FIG. 8, the brightness of video V1 by first projector 10 is defined in the correction table such that the brightness in first region A1 not including superimposed region A3 is 100%, and the brightness gradually decreases as the global projection angle increases in superimposed region A3. The brightness of video V2 by second projector 20 is defined in the correction table so as to gradually increase in superimposed region A3 as the global projection angle increases, and to become 100% in the second region not including superimposed region A3. The brightness in superimposed region A4 is similarly defined in the correction table illustrated in FIG. 7.

Note that for second projector 20, since the projection transformation matrices in superimposed regions A3, A4 are not generated, a correction table that defines the brightness corresponding to the second projection angle is created.

Video Generator

Video generator 32 generates video data of video V1 projected by first projector 10 and video V2 projected by second projector 20. The video data generated by video generator 32 is video data in which the brightness and the projection position are adjusted in accordance with the correction table illustrated in FIG. 7.

When video is projected, the timetable illustrated in FIG. 9 may be used. The timetable of FIG. 9 indicates an elapsed time from the start of projection of video, the projection position (global projection angle), and the content to be projected. For example, with the timetable illustrated in FIG.

9, it can be defined that content C1 is displayed at global projection angle θg2 when time of 00:01 has elapsed from the start of projection of video.

Alternatively, the projection angle may be freely controlled by an input device connected to controller 30, such as a mouse, a keyboard, or a touch panel. In this case, the timetable illustrated in FIG. 9 needs not be prepared.

Operation

Figure 10:
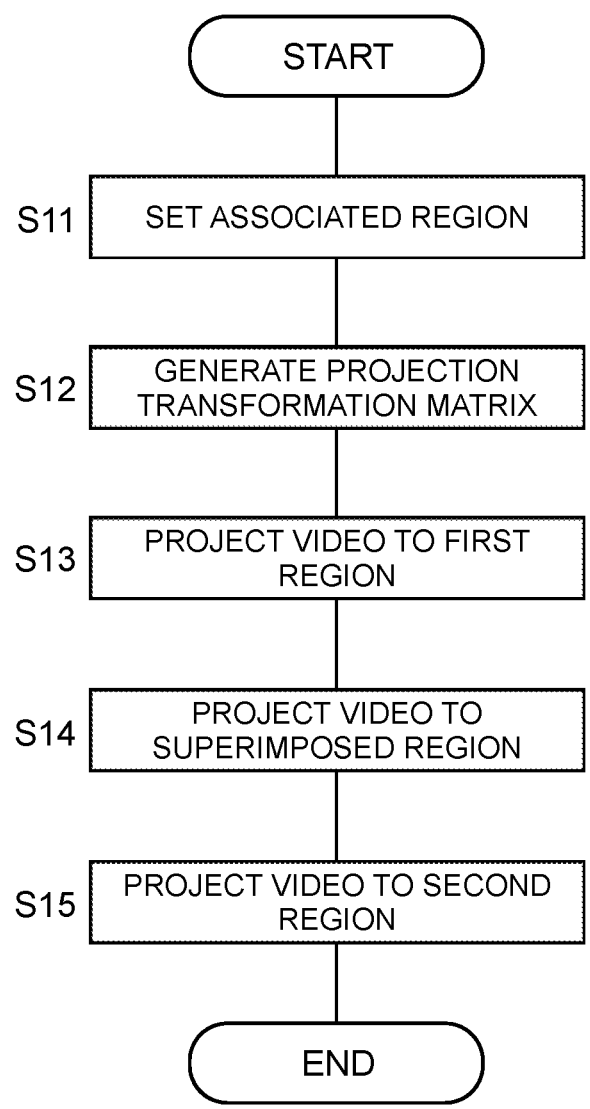
FIG. 10 is a flowchart illustrating an operation of the video projection system.

The operation of video projection system 100 configured as described above will be described with reference to FIG. 10. FIG. 10 is a flowchart illustrating the operation of video projection system 100. In the present exemplary embodiment, a case where the projection position of video moves from first region A1 to second region A2 through superimposed region A3 or superimposed region A4 will be described. The projection position of video may be controlled so as to move from second region A2 to first region A1 through superimposed region A3 or superimposed region A4, and the projection position of the video may be discretionarily moved in first region A1, second region A2, and superimposed regions A3, A4.

First, setting information of the associated region of each of first projector 10 and second projector 20 is stored in the storage by controller 30 (step S11). The associated region indicates first region A1 that is a range in which the projection position of video by first projector 10 moves, and second region A2 that is a range in which the projection position of video by second projector 20 moves. As described with reference to FIGS. 2A and 2B, first region A1 and second region A2 are set so as to partially overlap each other. First region A1, second region A2, and superimposed regions A3, A4 are defined by the first projection angle and the second projection angle. At this time, information on the global projection angle, which is angle information in which the first projection angle and the second projection angle are correlated, is generated, and the mapping table illustrated in FIG. 3B is generated. Information of set first region A1, second region A2, superimposed regions A3, A4, and global projection angle is stored in the storage.

Next, a projection transformation matrix is generated by transformation matrix generator 31 (step S12). The projection transformation matrix is generated based on the coordinate information of cursors C11 to C14 at above-described calibration points θa to θc. A projection transformation matrix in superimposed regions A3, A4 other than calibration points θa to θc is generated as necessary.

Steps S11 and S12 are processing executed before video is projected. Processing of projecting video while moving the projection position by video projection system 100 will be described in steps S13 to S16.

The video generator 32 generates video based on the timetable illustrated in FIG. 9. The generated video is transmitted to first projector 10 and second projector 20 together with the global projection angle indicating the projection position by first projector 10 and second projector 20. In a case where video generator 32 judges that the projection position indicated by the global projection angle is first region A1 not including superimposed regions A3, A4, video is projected by first projector 10 in first region A1 (step S13). The video projected by first projector 10 is generated by video generator 32. Note that the global projection angle may be input from an input device or the like connected to controller 30.

In a case where the projection position indicated by the global projection angle is included in superimposed regions A3, A4, superimposed video by first projector 10 and second projector 20 are projected in superimposed regions A3, A4 (step S14). That is, in superimposed regions A3, A4, video by first projector 10 and video by second projector 20 are projected in an overlapping manner. At this time, the video projected by first projector 10 is video subjected to coordinate transformation based on the projection transformation matrix generated in step S12. Video generator 32 generates video projected by first projector 10 based on the correction table illustrated in FIG. 7. The coordinates of the video projected by the first projector are transformed based on the projection transformation matrix generated in step S12, and the brightness is adjusted based on the correction table illustrated in FIG. 7.

Video generator 32 generates video to be projected onto superimposed regions A3, A4 by second projector 20. The brightness of video projected by the second projector is adjusted.

By transforming the coordinates of video by first projector 10 based on the projection transformation matrix, it is possible to improve the accuracy of alignment between video by first projector 10 and video by second projector 20 in superimposed regions, A3, A4. Video by first projector 10 whose brightness has been adjusted by coordinate transformation and video by second projector 20 whose brightness has been adjusted are projected in an overlapping manner, so that video free from change in brightness or shape deviation caused by being projected from two projectors is projected. Therefore, the projection position of the video can be moved from first region A1 to superimposed regions A3, A4 without giving a feeling of strangeness.

In a case where the projection position indicated by the global projection angle is included in second region A2 not including superimposed regions A3, A4, video is projected by second projector 20 in second region A2 (step S15). Video projected by second projector 20 is generated by video generator 32.

Steps S13 to S15 are repeatedly executed based on the timetable illustrated in FIG. 9 and the like.

When the process proceeds from step S13 to step S14, the second projection angle may be controlled in accordance with the first projection angle. For example, in a case where the projection position of video by first projector 10 moves from first region A1 to superimposed regions A3, A4, the projection position of video by second projector 20 may be moved, and control may be performed to wait for video by first projector 10 to move. Furthermore, the moving speed of the projection position of video by second projector 20 may be adjusted in accordance with the moving speed of the projection position of video by first projector 10.

Figure 11:
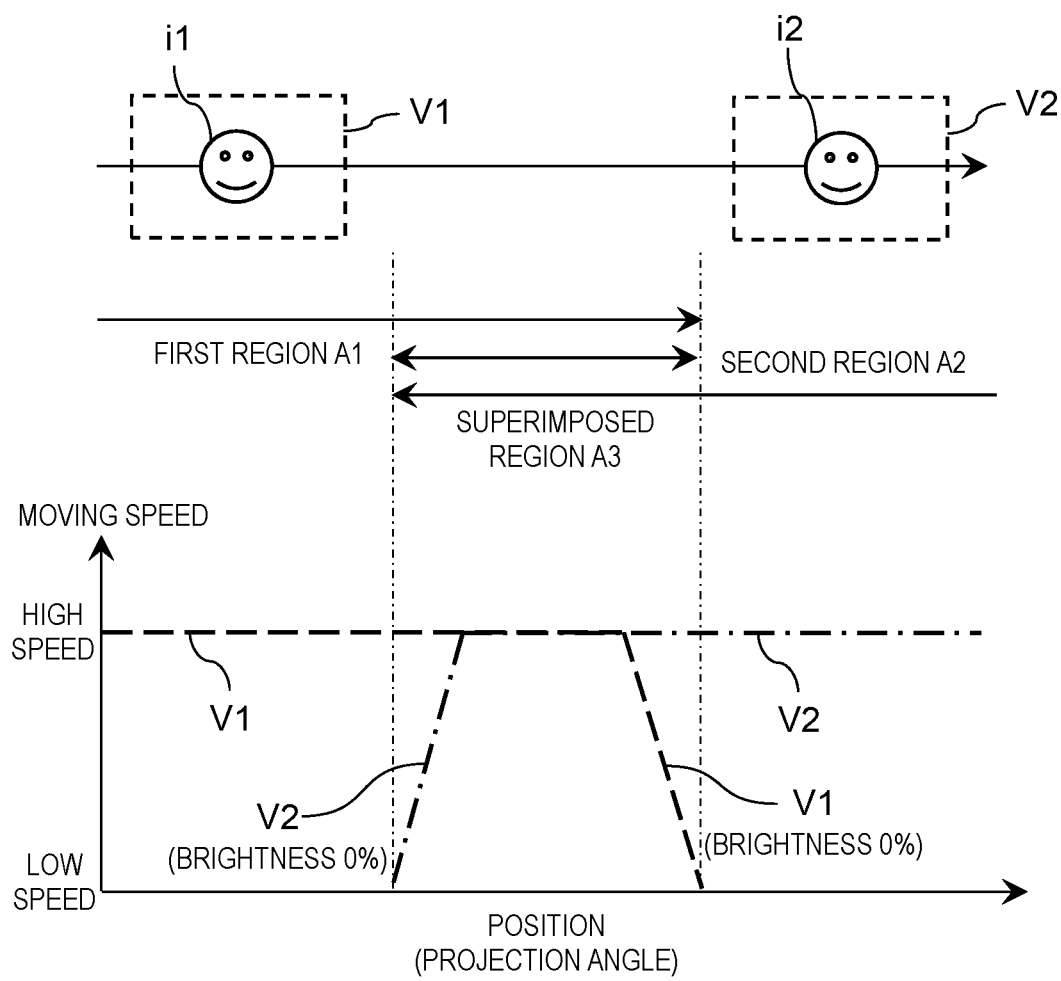
FIG. 11 is a view explaining a video projection method in a case where video passes through a superimposed region at high speed in the video projection system of FIG. 1.

FIG. 11 is a view explaining a video projection method in a case where video passes through a superimposed region at a high speed. For example, as illustrated in FIG. 11, in a case where video is moved from first region A1 to second region A2 through superimposed region A3, when the moving speed of the projection video becomes high, it becomes difficult to match the speed of video V2 by second projector 20 with video V1 by first projector 10 moving at a high speed at the same time when video V1 enters superimposed region A3. This is because a certain amount of time is required to accelerate the driving speed of a drive mechanism such as a moving mirror that moves video.

Therefore, in such a case, the driving speed of the moving mirror of second projector 20 is accelerated in advance, the moving speed of video V2 is matched with the moving speed of video V1, and then video V2 is projected at a predetermined brightness. Similarly, in a case where video moves from superimposed region A3 to second region A2, brightness of video V1 is set to 0% in advance, and the driving speed of the moving mirror of first projector 10 is decelerated. Note that control of the brightness in a case where video V1 and video V2 overlap is as described above.

In this way, by controlling projection video, in a case where first projector 10 moves the projection position of video at a high speed in first region A1, the moving speed of second projector 20 can be matched with the moving speed of first projector 10 in advance. Such control makes it possible to display video without giving a feeling of strangeness at the time of switching from first projector 10 to second projector 20 in a case where the projection position of video is moved at a high speed.

Similarly, when the process proceeds from step S14 to step S15, the projection position of video by first projector 10 may be moved, and control may be performed to wait for video by second projector 20 to move. Furthermore, the moving speed of the projection position of video by first projector 10 may be adjusted in accordance with the moving speed of the projection position of video by second projector 20.

Figure 12:
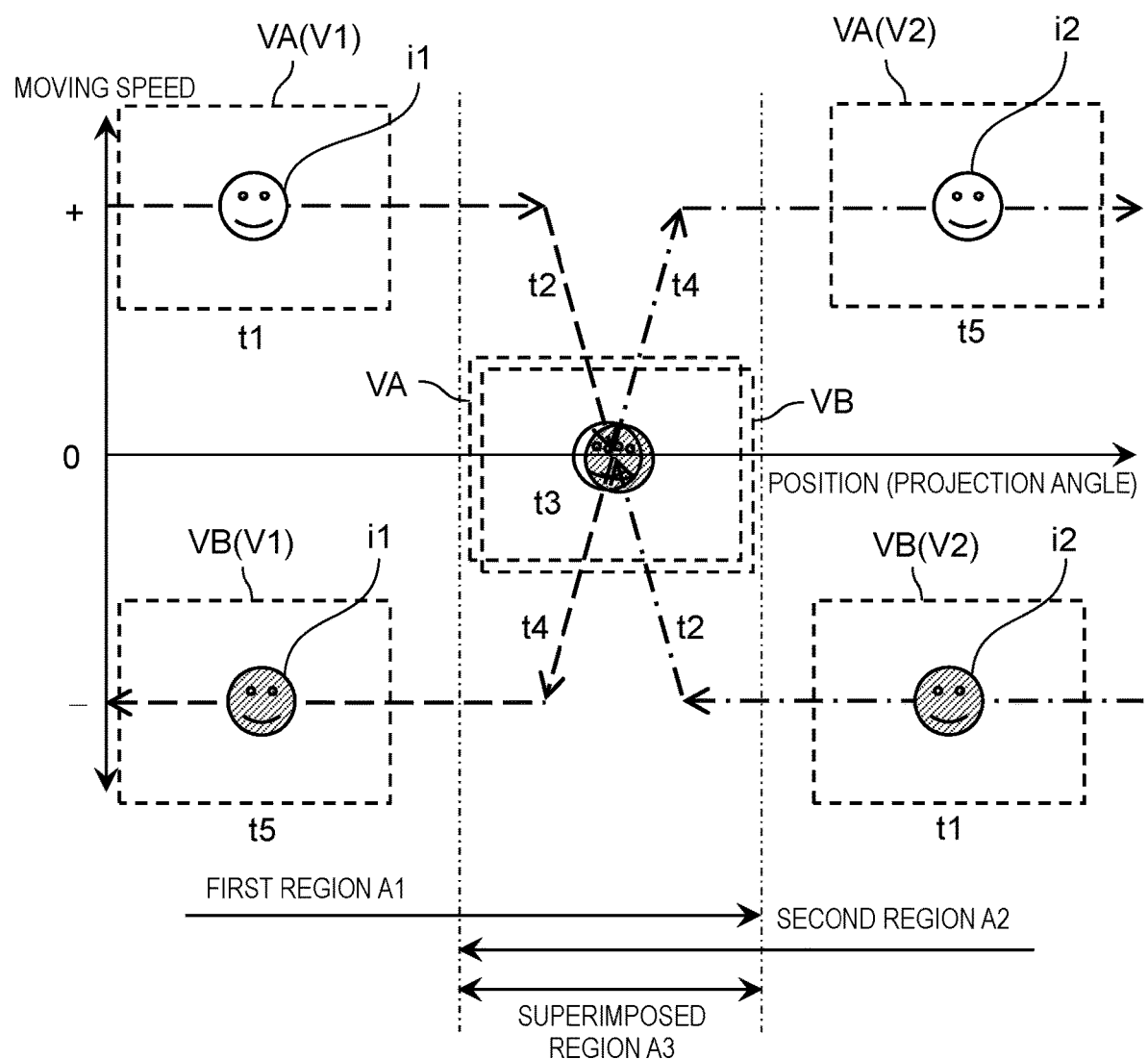
FIG. 12 is a view explaining a video projection method in a case where two pieces of video intersect in a superimposed region in the video projection system of FIG. 1.

Next, a case will be considered in which two projectors project two pieces of video (first video and second video), respectively, and the first video is moved from first region A1 to second region A2 through superimposed region A3, and the second video is moved from second region A2 to first region A1 through superimposed region A3. FIG. 12 is a view illustrating a video projection method by the video projection system in such a case. In such a case, it is necessary to perform projection such that, after first video VA projected as video V1 by first projector 10 and second video VB projected as video V2 by second projector 20 are once overlapped in superimposed region A3, first video VA is moved from superimposed region A3 to second region A2 as video V2 by second projector 20, and second video VB is moved from superimposed region A3 to first region A1 as video V1 by first projector 10. In order to project first video VA and second video VB in a state of retaining the continuity of first video VA and second video VB, it is necessary to switch first video VA from video V1 to video V2 and second video VB from video V2 to video V1 in superimposed region A3.

Specifically, as illustrated in FIG. 12, at time t1, first projector 10 projects, as video V1, first video VA moving from first region A1 to superimposed region A3 at a predetermined speed, and second projector 20 projects, as video V2, second video VB moving from second region A2 to superimposed region A3 at a predetermined speed. At time t2, in superimposed region A3, the moving speeds of first video VA (video V1) and second video VB (video V2) are decelerated. At time t3, first video VA and second video VB temporarily stop and overlap at a predetermined projection position, first video VA is switched to video V2 by second projector 20, and second video VB is switched to video V1 by first projector 10. At time t4, the moving speed of first video VA (video V2) is accelerated to a predetermined speed from superimposed region A3 toward second region A2, and the moving speed of second video VB (video V1) is accelerated to a predetermined speed from superimposed region A3 toward first region A1. At time t5, first video VA moves from superimposed region A3 to second region A2 as video V2 by second projector 20, and second video VB moves from superimposed region A3 to first region A1 as video V1 by first projector 10.

In this manner, first projector 10 and second projector 20 can project first video VA moving from first region A1 to second region A2 through superimposed region A3 and second video VB moving from second region A2 to first region A1 through superimposed region A3.

However, in the example illustrated in FIG. 12, first video VA and second video VB are temporarily stopped at predetermined projection positions, and the video moving as in the example illustrated in FIG. 11 is not projected without being stopped. In the example of FIG. 11, since two projectors project one piece of video, one projector can wait for moving video by the other projector in a superimposed region by accelerating the driving speed of the moving mirror, but in a case where the two projectors in FIG. 12 each project video, such control is impossible. That is, as illustrated in FIG. 12, since time t3, video V1 changes from the movement in the direction (right direction) from first region A1 to superimposed region A3 to the movement in the reverse direction (left direction), and video V2 changes from the movement in the direction (left direction) from second region A2 to superimposed region A3 to the movement in the reverse direction (right direction). This reversal in the movement direction is performed by reversing the drive of a drive mechanism such as a moving mirror of the projector, but since it is difficult to instantaneously reverse the drive of the drive mechanism, videos V1, V2 are controlled to be temporarily stopped at time t3.

Figure 13:
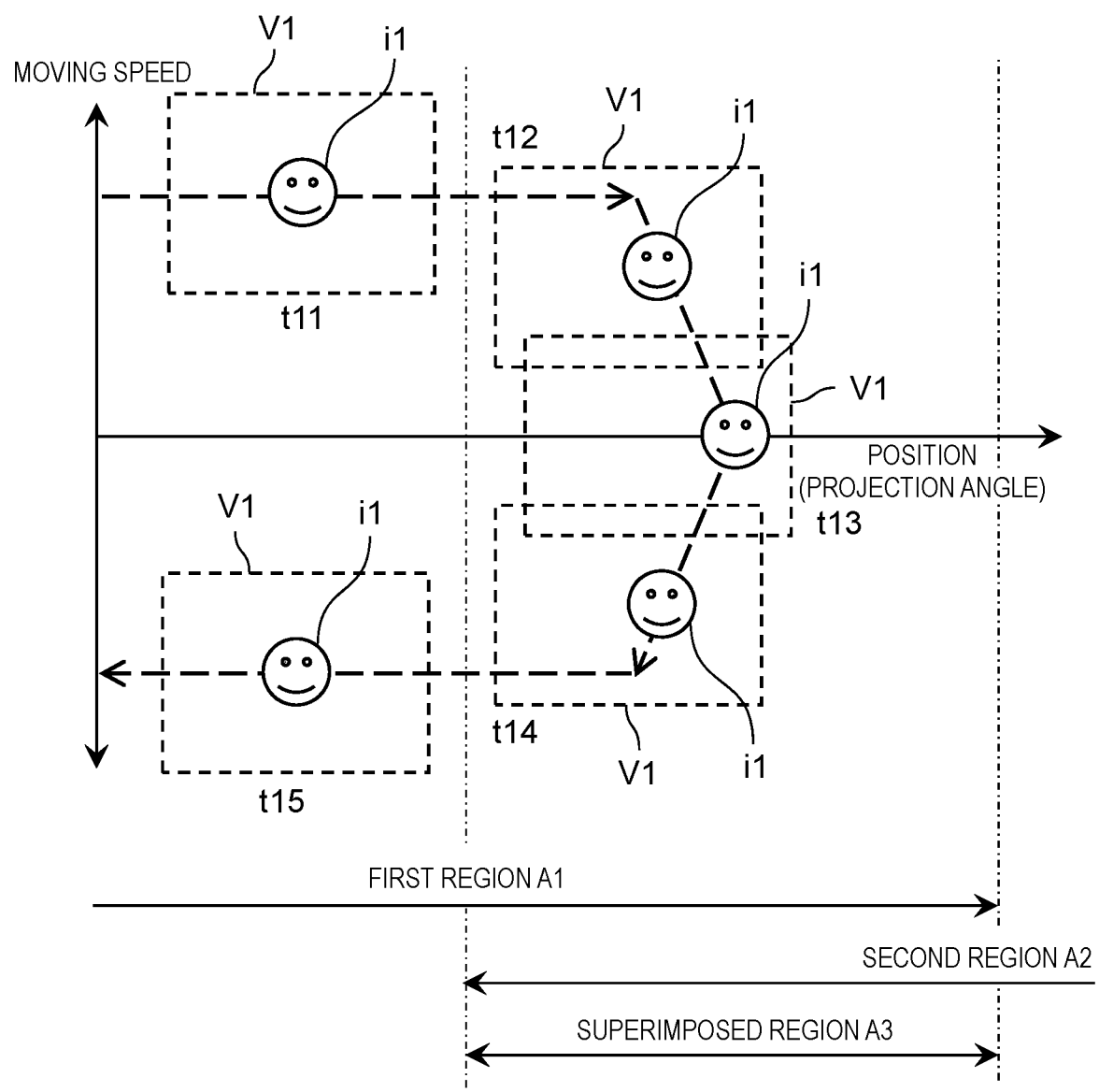
FIG. 13 is a view explaining a video projection method at the time of reversal of driving of a moving mirror in the video projection system of FIG. 1.

Next, a description will be given regarding a method of performing projection such that the movement of an image in projection video is not stopped even if the drive mechanism is temporarily stopped and the movement of the projection position of the projection video is temporarily stopped at the time of reversal of the driving of the drive mechanism such as the moving mirror. FIG. 13 is a view explaining a projection method of image at the time of reversal of driving of the moving mirror in video projection system 100.

As illustrated in FIG. 13, at time t11, first projector 10 projects video V1 moving at a predetermined speed in a direction (right direction) from first region A1 to superimposed region A3. At this time, the display position of image i1 displayed in video V1 is the center of video V1. Since the driving direction of the drive mechanism such as the moving mirror is reversed at time t3 to change the movement direction of video V1 from the right direction to the left direction, at time t12 immediately before that, the driving of the drive mechanism is decelerated and the movement of video V1 in the right direction is also decelerated. At this time, the projection video is generated such that the display position of image i1 with respect to video V1 moves in the right direction so that the movement of image i1 in video V1 is not decelerated even if the movement of video V1 is decelerated. At time t13, the display position of image i1 is positioned on the rightmost side of video V1. At time t14 immediately after that, the driving of the drive mechanism is controlled so that the movement of video V1 is accelerated in the direction (left direction) from superimposed region A3 to first region A1. At this time, in order to compensate for the acceleration of the movement of video V1, projection video is generated such that the display position of image i1 with respect to video V1 moves in the left direction (right side from the center of video V1) from the display position (rightmost side) at the time t13. At subsequent time t15, image i1 moves to the center of video V1, and first projector 10 projects video V1 (image i1) moving at a predetermined speed in the direction (left direction) from superimposed region A3 to first region A1.

By moving the display position of image i1 in the projection video before and after the reversal of the driving of the drive mechanism such as the moving mirror, image i1 in the projection video can be projected so as to move even if the driving of the drive mechanism is temporarily stopped and the movement of projection video is stopped. At time t13 at which the movement of projection video stops, the projection can be performed such that the movement direction of an image is instantaneously reversed. Although FIG. 13 explains video V1 (image i1) projected by first projector 10, video V2 (image i2) projected by second projector 20 can be similarly controlled.

By applying the projection method illustrated in FIG. 13 to the case illustrated in FIG. 12, even if first video VA and second video VB are temporarily stopped in superimposed region A3, image in first video VA and image in second video VB can be projected so as to move without stopping. That is, image i1 of first video VA (video V1) moving in the direction (right direction) from first region A1 to superimposed region A3 continues to move in the right direction by moving the display position with respect to video V1 in the right direction even immediately before the reversal of the driving of the moving mirror. Similarly, image i2 of second video VB (video V2) moving in the direction (left direction) from second region A2 to superimposed region A3 continues to move in the left direction by moving the display position with respect to video V2 in the left direction. When the driving of the moving mirror is reversed, image i1 and image i2 overlap, image i1 of first video VA (video V1) is switched to image i2 of video V2, and image i2 of second video VB (video V2) is switched to image i1 of video V1. Then, also immediately after reversal of the driving of the moving mirror, projection can be performed such that image i1 of video V1 moves in the left direction and image i2 of video V2 moves in the right direction instantaneously.

The method explained based on FIG. 13 can also be applied to, for example, a case where an image moving in the right direction instantaneously reverses the movement direction at a predetermined position and projects motion (bounce) to move in the reverse direction (left direction). That is, in a case where first projector 10 projects a bouncing motion at a certain position (bouncing position) of image i1 in video V1 moving in the right direction, the driving of the drive mechanism such as the moving mirror of first projector 10 is reversed at a time point when image i1 reaches the bouncing position. At this time, video V1 is controlled and projected such that the display position of image i1 positioned at the center of video V1 moves in the right direction with respect to video V1 immediately before reversal of the driving of the drive mechanism (at the time of deceleration), moves to the rightmost side at the bouncing position, and moves in the left direction immediately after the reverse (at the time of acceleration) and returns to the center of video V1.

Note that in video projection system 100, as illustrated in FIG. 3B, the projection range of projection video projected by first projector 10 and second projector 20 is a range where the projection angle is 0 degrees to 220 degrees. However, as described in FIG. 13, by moving the display positions of images i1, i2 in the projection video with respect to videos V1, V2, respectively, the projection ranges of images i1, i2 can be enlarged.

Effects

According to the above-described exemplary embodiment, in a case of projecting video by a plurality of projectors capable of moving a projection position, it is possible to improve alignment accuracy.

By transforming the coordinates of the projection position of video by first projector 10 in accordance with video by second projector 20 in superimposed regions A3, A4, it is possible to overlap video by the first projector and video by the second projector. Therefore, also in a case where the projection position of video is moved from first region A1 to second region A2, video can be displayed without giving a feeling of strangeness even though the projector is switched from first projector 10 to second projector 20.

The projection video can be adjusted without using a camera that captures projected video. This enables the video projection system to be achieved with a simple configuration.

By arranging a plurality of projectors so as to compensate for blind spot of one another, it is possible to eliminate restriction of a projection range of the projectors.

By setting each associated region based on the distance between the projection surface and each projector, it is possible to suppress disturbance of video due to focus deviation.

Note that in the above-described exemplary embodiment, it has been described that video by first projector 10 and video by second projector 20 are aligned using a projection transformation matrix, but the present disclosure is not limited to this. For example, by preparing a three-dimensional space model in advance as a virtual space, and capturing an object reproduced by computer graphics (CG) in the virtual space by two virtual cameras arranged at positions of two projectors, it is possible to generate projection video data, and by projecting the projection video data by the two projectors, it is possible to align video.

Note that in the above-described exemplary embodiment, an example of projecting video in a room surrounded by walls on four sides has been described, but the projection surface of video is not limited to this. For example, it can be applied to various projection surfaces such as outdoor wall surfaces and screens.

An example has been described in which the brightness of video by first projector 10 and the brightness of video by second projector 20 are gradually changed in superimposed regions A3, A4, but the brightness adjustment method is not limited to this. For example, the brightness of video by first projector 10 and that by second projector 20 may be adjusted to 50% in superimposed regions A3, A4. Alternatively, adjustment such that one is 0% and the other is 100% is also possible. The brightness adjustment method is only required to make the brightness in superimposed regions A3, A4 substantially equal to the brightness in first region A1 and second region A2, and to display video without giving a feeling of strangeness.

While an example in which of including two projectors has been described, more than or equal to three projectors may be provided.

For example, video generator 32 included in controller 30 may be included in each of first projector 10 and second projector 20. In this case, the correction table illustrated in FIG. 7 is stored in the storages of first and second projectors 10, 20, and the video generators of first and second projectors 10, 20 generate video based on the projection angle transmitted from controller 30. The projection angle transmitted from controller 30 at this time may be a global projection angle. Alternatively, the first projection angle or the second projection angle of respective projector may be used.

An example has been described in which the brightness of both video V1 by first projector 10 and video V2 by second projector 20 is lowered in superimposed regions A3, A4, but the present invention is not limited to this. For example, the brightness of video by one projector may be set to 0%, and the brightness of video by the other projector may be set to 100% in superimposed regions A3, A4. Alternatively, the brightness of video by one projector may be set to 30%, and the brightness of video by the other projector may be set to 70% in superimposed regions A3, A4. Processing is only required to be performed such that in superimposed regions A3, A4, the brightness of overlapped video becomes equivalent to the brightness in first region A1 and second region A2.

Second Exemplary Embodiment

The second exemplary embodiment will be described with reference to FIGS. 14 and 15. In the second exemplary embodiment, the same or equivalent configurations as those in the first exemplary embodiment are denoted by the same reference marks as those in the first exemplary embodiment. The description already given for the first exemplary embodiment is omitted for the second exemplary embodiment.

Figure 14:
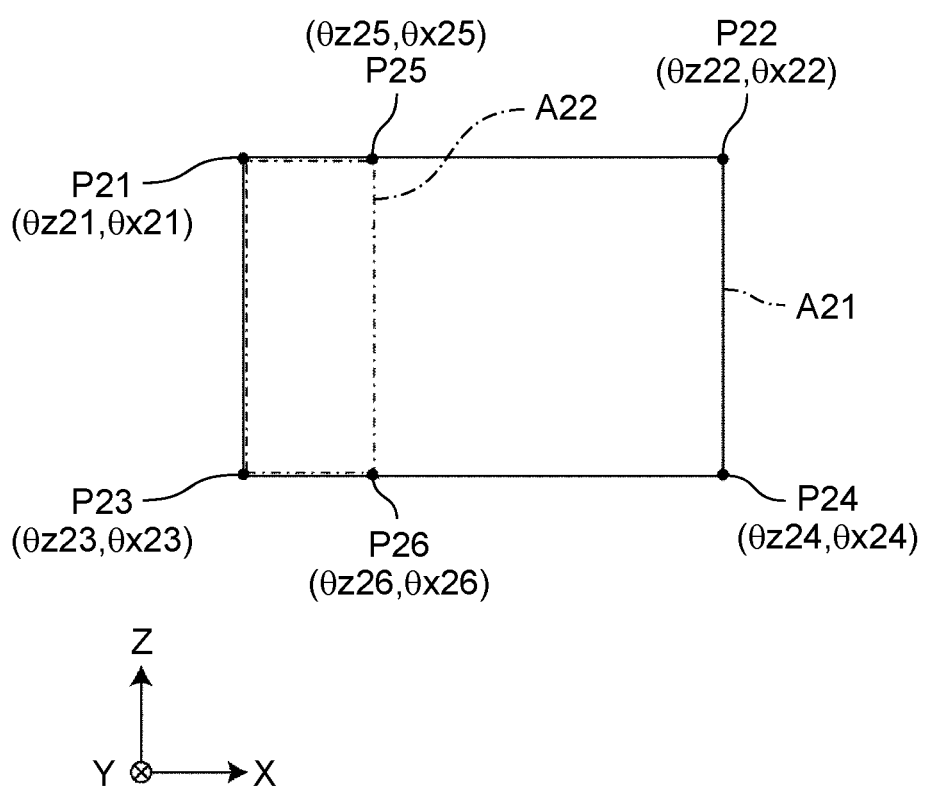
FIG. 14 is a view illustrating a first region and a superimposed region in the video projection system according to a second exemplary embodiment.

FIG. 14 is a view illustrating first region A21 and superimposed region A22 in video projection system 100 according to the second exemplary embodiment. FIG. 15 is a view explaining the calculation method of cursor coordinates in superimposed region A22 of FIG. 14.

The second exemplary embodiment is different from the first exemplary embodiment in that projection directions of projection light of first projector 10 and second projector 20 are determined by rotations in two directions of rotation about the Z-direction as an axis and rotation about the X-direction as an axis illustrated in FIG. 14. That is, the first projection angle and the second projection angle of respective projectors are determined by two axes. Note that FIG. 14 omits the second region that is a region associated with second projector 20.

First region A21, which is a region associated with first projector 10, is a region surrounded by lines connecting four points P21 to P24 illustrated in FIG. 14. Superimposed region A22 is a region surrounded by lines connecting point P21, point P25, point P23, and point P26. Let the projection direction of projection light of first projector 10 with the Z-direction as an axis be θz, and let the projection direction of the same with the X-direction as an axis be θx. The projection angle at each point is expressed by (θz, θx). The projection angles of respective points P21 to P26 are illustrated in FIG. 14.

In the present exemplary embodiment, as illustrated in FIG. 15, six calibration points e1 to e6 are provided in superimposed region A22, and alignment of video by first projector 10 with respect to video by second projector 20 is performed at each of calibration points e1 to e6. The calibration point may be one point at the center of superimposed region A22 or a plurality of points as illustrated in FIG. 15.

The projection transformation matrices at calibration points e1 to e6 can be generated from the coordinates of cursors C11 to C14 (see FIG. 5C) stored at respective calibration points e1 to e6.

The projection transformation matrix of a point other than calibration points e1 to e6, for example, point e7 illustrated in FIG. 15 can be the projection transformation matrix of the calibration point having the closest projection angle.

Alternatively, the coordinates of cursors C11 to C14 at point e7 can be calculated from the ratio of the difference in the projection angles from calibration points e1 to e4 near point e7, and the projection transformation matrix can be generated based on the calculated coordinates. Specifically, based on distances La to Ld in the projection angle system between point e7 and nearby calibration points e1 to e4, coordinates (Xe7, Ye7) of cursor C11 at point e7 are calculated by Mathematical formulae 3 and 4. The coordinates of cursor C11 at respective calibration points e1 to e4 are (Xe1, Ye1), (Xe2, Ye2), (Xe3, Ye3), and (Xe4, Ye4).

$$Xe7 = \left(Xe1 \times \frac{La}{La+Lb+Lc+Ld}\right) + \left(Xe2 \times \frac{Lb}{La+Lb+Lc+Ld}\right) + \left(Xe3 \times \frac{Lc}{La+Lb+Lc+Ld}\right) + \left(Xe4 \times \frac{Ld}{La+Lb+Lc+Ld}\right)$$
[Mathematical formula 3]

$$Ye7 = \left(Ye1 \times \frac{La}{La+Lb+Lc+Ld}\right) + \left(Ye2 \times \frac{Lb}{La+Lb+Lc+Ld}\right) + \left(Ye3 \times \frac{Lc}{La+Lb+Lc+Ld}\right) + \left(Ye4 \times \frac{Ld}{La+Lb+Lc+Ld}\right)$$
[Mathematical formula 4]

Similarly, the coordinates of cursors C12 to C14 at point e7 can be calculated, and the projection transformation matrix at point e7 can be generated based on the calculated coordinates of the respective cursors C11 to C14.

Effects

According to the above-described exemplary embodiment, even in the case of a projector in which the projection angle is determined by two axes, the alignment accuracy can be improved. Since the projection angle is determined by two axes, the projection position of video can be moved vertically and horizontally without exception.

Third Exemplary Embodiment

Overall Configuration

The third exemplary embodiment will be described with reference to FIGS. 16 to 19B. In the third exemplary embodiment, the same or equivalent configurations as those in the first exemplary embodiment are denoted by the same reference marks as those in the first exemplary embodiment. The description already given for the first exemplary embodiment is omitted for the third exemplary embodiment.

Figure 16:
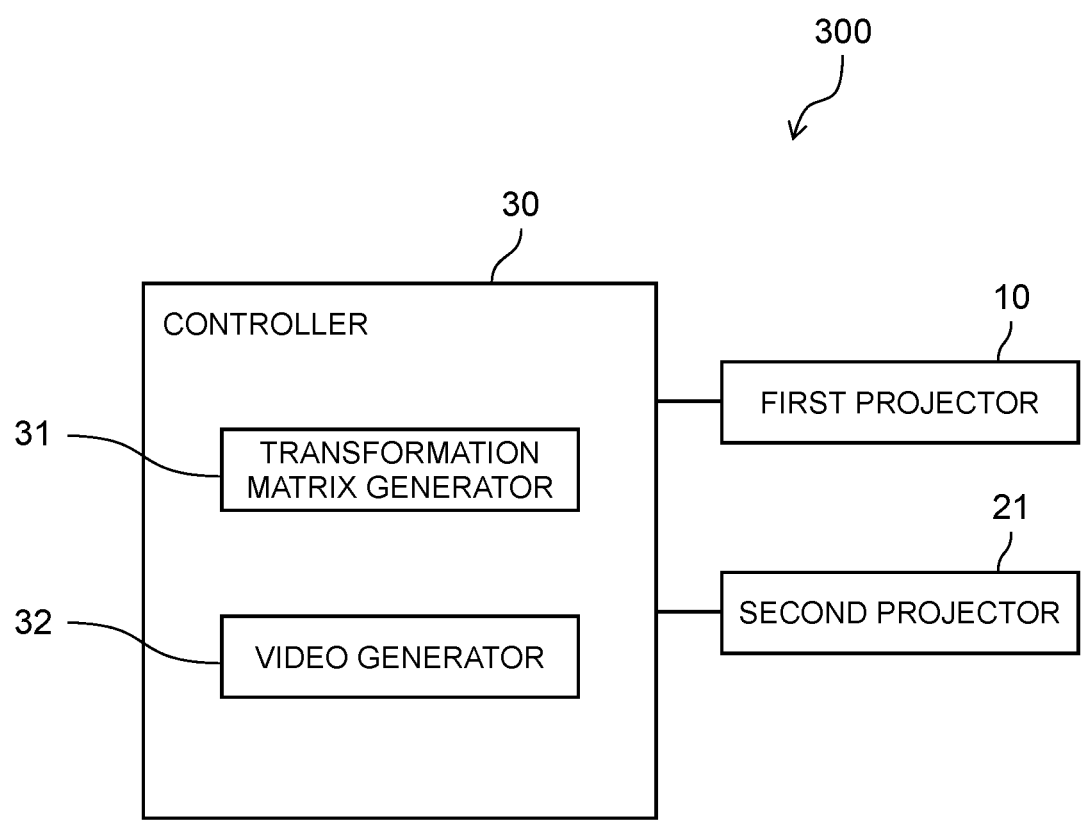
FIG. 16 is a block diagram illustrating a configuration of a video projection system according to a third exemplary embodiment.
Figure 17:
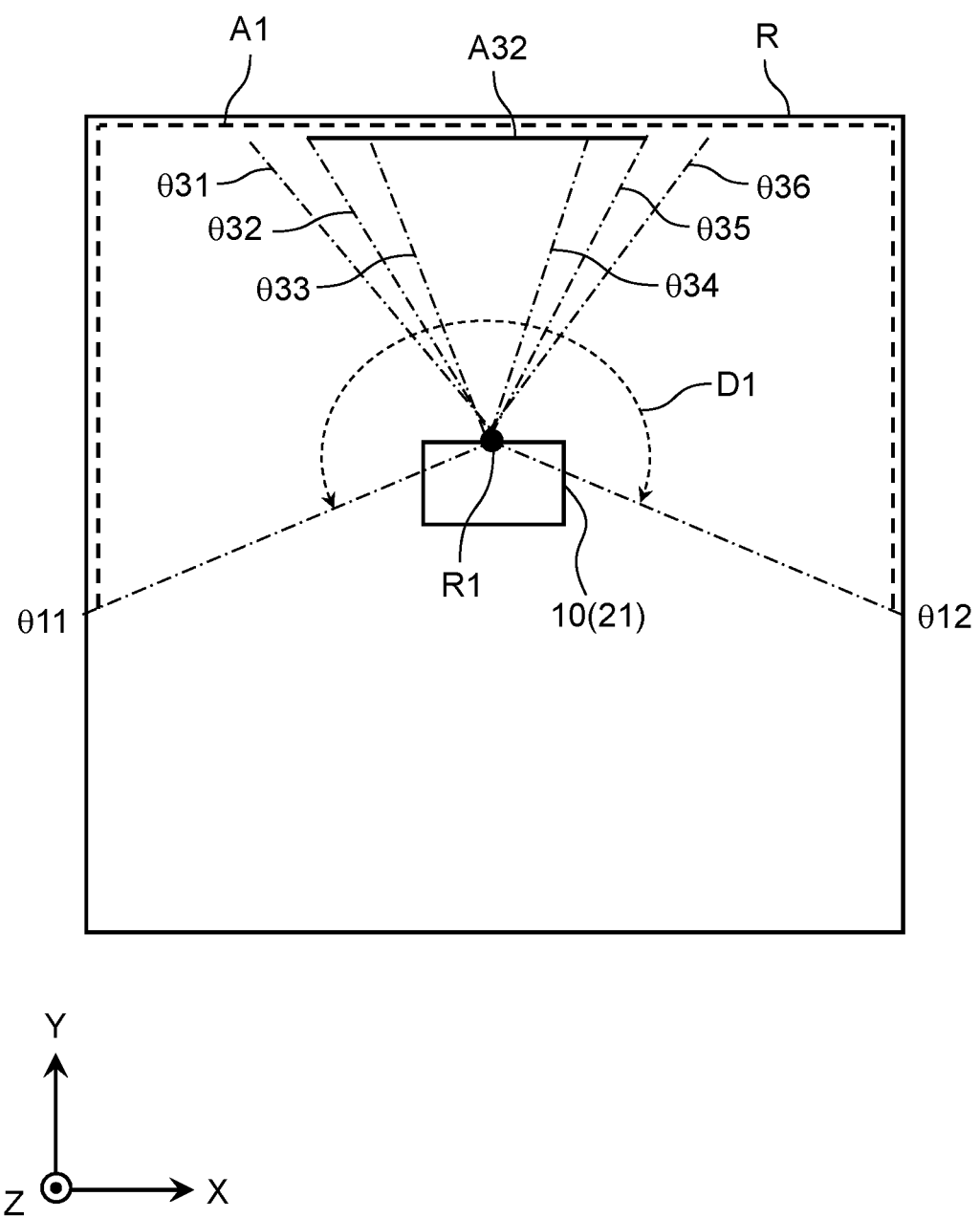
FIG. 17 is a view illustrating projection regions of the first projector and the second projector in the video projection system of FIG. 16.

FIG. 16 is a block diagram illustrating the configuration of video projection system 300 according to the third exemplary embodiment. FIG. 17 is a view illustrating projection regions respectively associated with first projector 10 and second projector 21 of video projection system 300.

As illustrated in FIG. 16, video projection system 300 includes first projector 10, second projector 21, and controller 30.

Projector

Video projection system 300 includes a plurality of projectors including first projector 10 and second projector 21.

Similarly to the first exemplary embodiment, first projector 10 can move the projection position of video by varying the projection direction of video. In video projection system 300, the projection direction of first projector 10 is determined by rotation about the Z-direction as an axis, as explained in the first exemplary embodiment. On the other hand, second projector 21 does not have a drive mechanism such as a moving mirror that reflects video (projection light) and moves the projection position, and the projection position of video is fixed.

First projector 10 and second projector 21 generate video based on a video signal input from controller 30, and output projection light (for example, visible light) to be projected onto a projection surface such as a screen or a wall. In video projection system 300, both first projector 10 and second projector 21 project video having the number of pixels of 4K (horizontal 3840 pixels×vertical 2160 pixels). Note that the number of pixels of video projected by first projector 10 and second projector 21 may be 2K (horizontal 1920 pixels×vertical 1080 pixels) or 8K (horizontal 7680 pixels×vertical 4320 pixels), and are not necessarily the same but may be different.

Each of first projector 10 and second projector 21 is disposed at a position where projection light can be output toward a projection surface such as a wall surface or a screen. In the present exemplary embodiment, as illustrated in FIG. 17, first projector 10 and second projector 21 are disposed to overlap each other in the up-down direction (Z-direction) near the center of room R surrounded by walls on four sides. FIG. 17 is a view of room R as viewed from above.

The region (projection region) where first projector 10 can project video is similar to that in the first exemplary embodiment, and is first region A1 indicated by a broken line in FIG. 17. The region (projection region) where second projector 21 can project video is second region A32 indicated by a solid line in FIG. 17. Since the projection position of second projector 21 is fixed and does not move, the projection position of second projector 21 is second region A32, and video projected by second projector 21 is projected on entire second region A32.

Figure 18A:
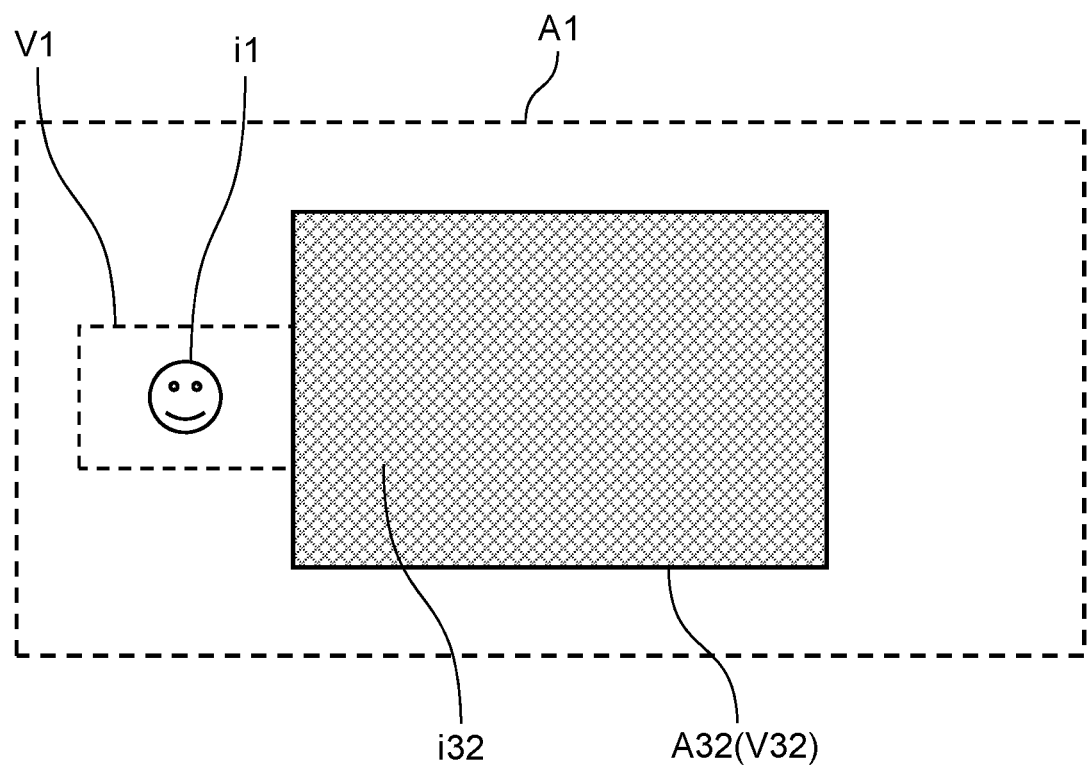
FIG. 18A is a view illustrating a relationship (not superimposed) between a projection position of the first projector and a projection region of the second projector in the video projection system of FIG. 16.
Figure 18B:
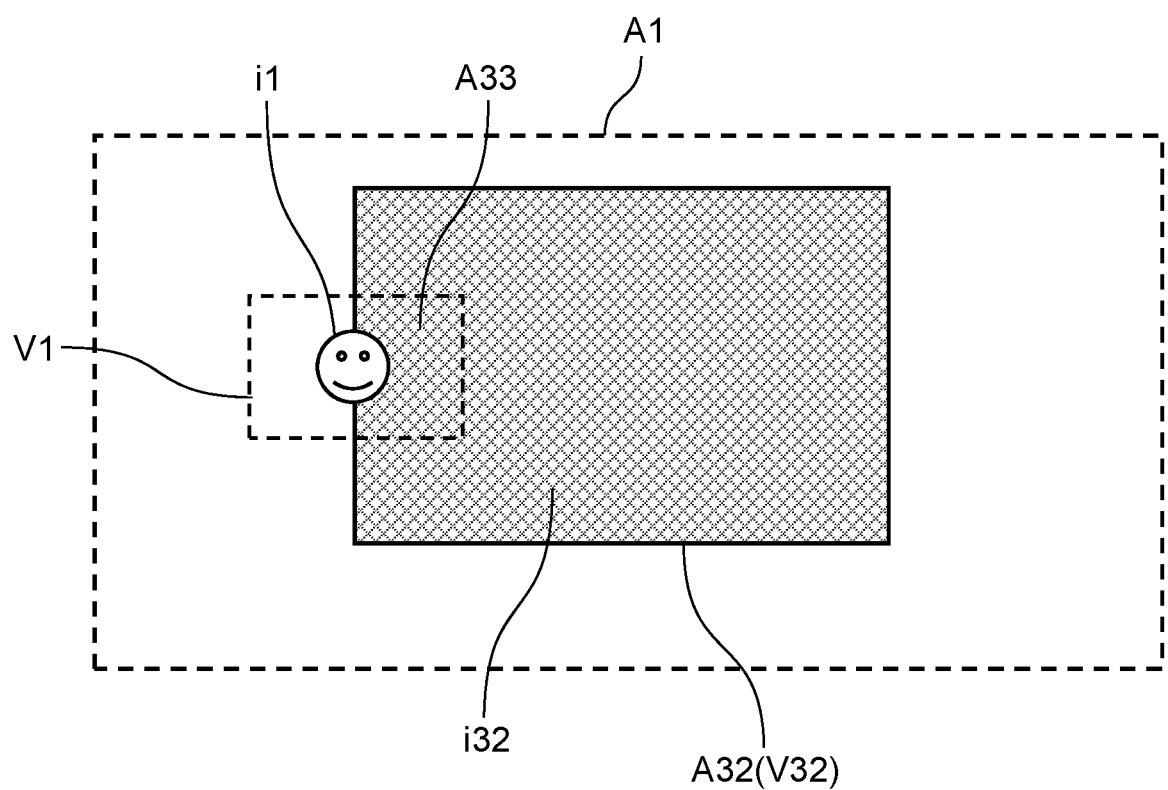
FIG. 18B is a view illustrating a relationship (partially superimposed) between a projection position of the first projector and a projection region of the second projector in the video projection system of FIG. 16.
Figure 18C:
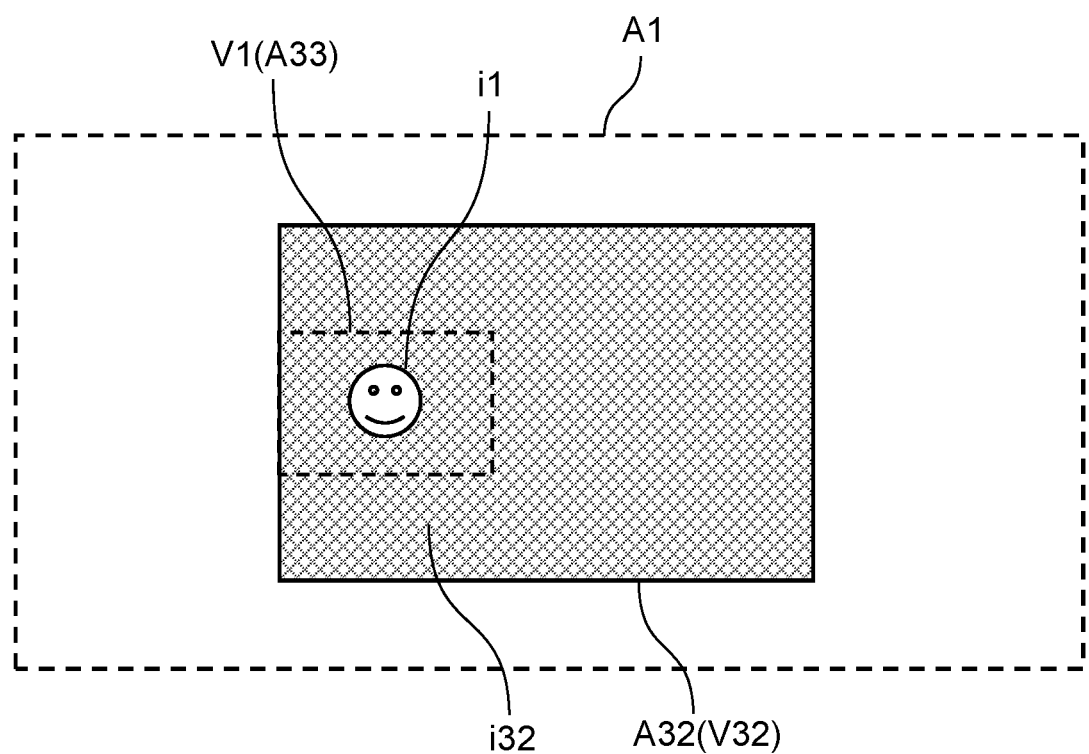
FIG. 18C is a view illustrating a relationship (entirely superimposed) between a projection position of the first projector and a projection region of the second projector in the video projection system of FIG. 16.

FIGS. 18A to 18C are views explaining a relationship between the projection position of video projected by first projector 10 and the projection position of video projected by second projector 21 in video projection system 300. FIG. 18A illustrates a case where video V31 projected by first projector 10 and video V32 projected by second projector 21 do not overlap (angle θ31), FIG. 18B illustrates a case where a part of the projection position of video V31 projected by first projector 10 overlaps the projection position of video V32 projected by second projector 21 (angle θ32), and FIG. 18C illustrates a case where the entire projection position of video V31 projected by first projector 10 overlaps the projection position of video V32 projected by second projector 21 (angle θ33).

In video projection system 300, as illustrated in FIGS. 18A to 18C, second region A32, which is the projection position of second projector 21, is entirely included in first region A31, which is the projection region of first projector 10. That is, second region A32, which is the projection region of second projector 21, is a superimposed region.

In video projection system 300, the size (that is, the area of second region A32) of video V32 projected by second projector 21 is set to be 6.25 times (horizontal 2.5 times× vertical 2.5 times) the size of video V1 projected by first projector 10. Note that the ratio of the size of video V32 by second projector 21 to the size of video V1 by first projector 10 may be set to, for example, 4 times (horizontal 2 times×vertical 2 times) or 9 times (horizontal 3 times× vertical 3 times).

Controller

As illustrated in FIG. 16, controller 30 controls projection of video by first and second projectors 10, 21.

Transformation Matrix Generator

Transformation matrix generator 31 generates a projection transformation matrix for transforming the coordinate system of the projection position of first projector 10 in accordance with the projection position of video by second projector 21 in second region A32, which is a superimposed region of video projection system 300. In video projection system 300, in consideration of the size of video V1, as illustrated in FIG. 17, when the first projection angle is in a range of angles θ31 to θ36, at least a part of video V1 overlaps video V32, and therefore the projection transformation matrix is created in this angle range.

Transformation matrix generator 31 creates a correction table based on the generated projection transformation matrix. FIG. 19A is an example of a correction table in video projection system 300. In the correction table, the resolution or the brightness of video V1 by first projector 10, and the brightness and the projection transformation matrix in superimposed part A33 with video V1 of video V32 by second projector 21 are defined corresponding to the first projection angle. Here, the resolution means the number of pixels per unit area of projection video. As described above, the number of pixels of video V1 and video V32 is equivalent to 4K, but the ratio of area of the projection part at the projection position of video V1 and video V32 is 1:6.25. Therefore, the resolution of video V1 is 6.25 times the resolution of video V32. With the resolution, the brightness of video V1 is 6.25 times the brightness of video V32.

In a case where the first projection angle is in a range of angles θ11 to θ31 and a range of angles θ36 to θ12, superimposition of video V1 by first projector 10 and video V32 by second projector 21 does not occur, and therefore, adjustment control is not performed for the resolution and brightness of video V1 and the brightness of video V32, and the resolution and brightness of video V1 and the brightness of video V32 are all 100%. A projection transformation matrix is not generated in a range where this superimposition does not occur.

In a case where the first projection angle is in a range of angles θ31 to θ36, video V1 by first projector 10 is projected onto second region A32, which is a projection position of second projector 21, and video V1 is superimposed onto video V32 by second projector 21. As described above, since the resolution and brightness of video V1 and video V32 are different from each other, in superimposed part A33, it is necessary to perform adjustment control of these resolution and brightness in order to display the entire video without giving a feeling of strangeness. In a case where the first projection angle is in the range of angles θ31 to θ36, video projection system 300 performs adjustment control for the resolution or brightness of video V1 by first projector 10 and the brightness of video V32 by second projector 21 in the superimposed range with video V1.

Specifically, in the case where the first projection angle is in the range of angles θ31 to θ36, as illustrated in FIG. 19A, the resolution or brightness of video V1 by first projector 10 is reduced from 100% to 16%, and the brightness of video V32 by second projector 21 in superimposed part A33 is reduced from 100% to 0%. At this time, in the case where the resolution of video V1 is reduced to 16%, the brightness of video V1 remains 100%, and in the case where the brightness of video V1 is reduced to 16%, the resolution of video V1 remains 100%. In this control method, video V32 by second projector 21 is replaced with video V1 by first projector 10 in superimposed part A33. This control makes it possible to make the brightness of video V1 by first projector 10 equal to the brightness of video V32 by second projector 21.

Note that in the above control, only one of the resolution and the brightness of video V1 by first projector 10 is reduced to 16%, but the brightness of video V1 by first projector 10 may be made equal to the brightness of video V32 by second projector 21 by adjusting both the resolution and the brightness of video V1, for example, by reducing the resolution of video V1 to 32% and reducing the brightness to 50% or reducing the resolution of video V1 to 50% and reducing the brightness to 32%.

Figure 19B:
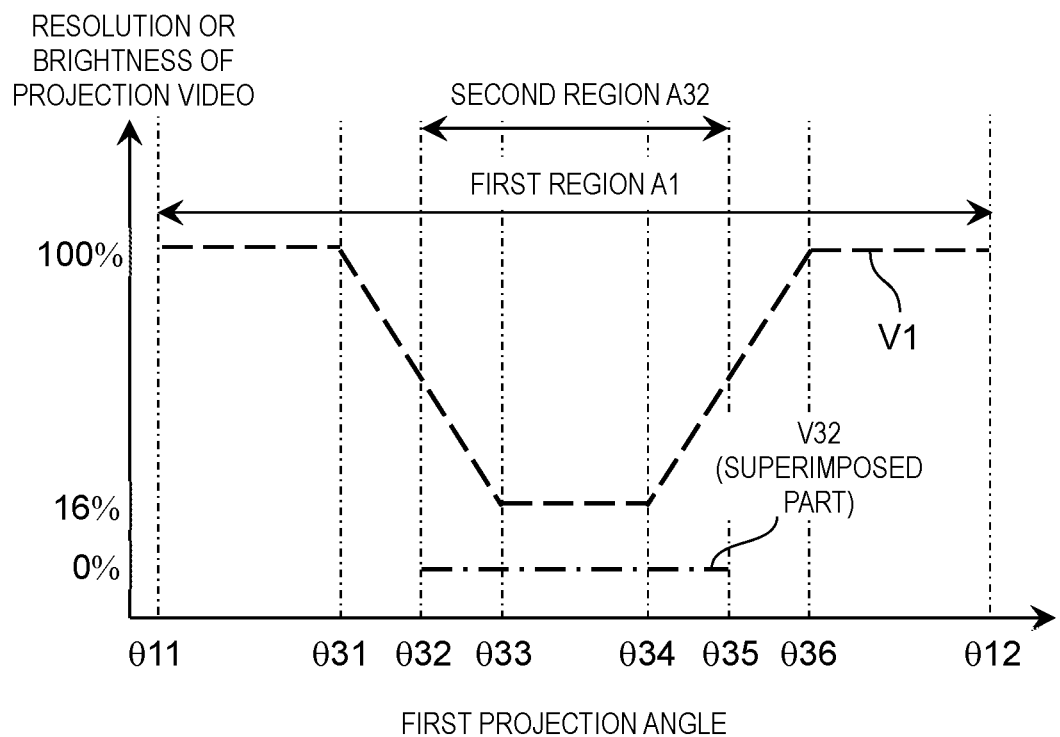
FIG. 19B is a view illustrating a second example for defining a correction table in the video projection system of FIG. 16.

FIG. 19B is a second example for defining the correction table in video projection system 300. In the first example illustrated in FIG. 19A, the resolution and brightness of video V1 are constant in the range of angles θ31 to θ36 of the first projection angle at which at least a part of video V1 by first projector 10 overlaps video V32 by second projector 21. In the second example illustrated in FIG. 19B, the resolution or brightness of video V1 is gradually reduced in response to the size of superimposed part A33 where video V1 and video V32 overlap. Specifically, in the range of angles θ31 to θ33 of the first projection angle at which a part of video V1 overlaps video V32, the degree of reduction becomes large such that the resolution or brightness of video V1 is gradually reduced from 100% to 16% in response to change of the first projection angle from angle θ31 to angle θ33. In the range of angles θ34 to θ36 of the first projection angle at which a part of video V1 overlaps video V32, the degree of reduction becomes small such that the resolution or brightness of video V1 gradually increases from 16% to 100% in response to change of the first projection angle from angle θ34 to angle θ36. In the range of angles θ33 to θ34 of the first projection angle at which entire video V1 overlaps video V32, the resolution or brightness of video V1 is constant at 16% similarly to FIG. 19A. As described above, in the case that a part of video V1 overlaps video V32, the correction table may be defined so that the reduction degree of the resolution or brightness of video V1 changes in response to the size of superimposed part A33.

Video Generator

Video generator 32 generates video data of video V1 projected by first projector 10 and video V32 projected by second projector 21. In the case where superimposition occurs between video V1 projected by first projector 10 and video V32 by second projector 21, video generator 32 transmits video data of video V1 to first projector 10 and video data of video V32 to second projector 21 in accordance with the above-described correction table.

Similarly to the case of the first exemplary embodiment, transmission of the video data is performed in accordance with the timetable. In this case, movement of the projection position of video V1 by first projector 10 is performed based on the first projection angle defined in the timetable. Since the projection position of second projector 21 does not move, the video data of video V32 is transmitted from video generator 32 to second projector 21 in accordance with the time and the content specified in the timetable.

Effects

According to video projection system 300, it is possible to improve the alignment accuracy of two pieces of video in a case of projecting video by a projector whose projection position can be moved and video by a projector whose projection position is fixed. By adjusting the resolution and brightness of video, it is possible to display entire video including two pieces of video without giving a feeling of strangeness.

Note that an example has been described in which video projection system 300 includes two projectors, that is, a projector whose projection position can be moved and a projector whose projection position is fixed, but the number of projectors may be more than or equal to two.

As described in the second exemplary embodiment, the projection direction of first projector 10 may be determined by rotation in two directions, that is, rotation around the Z-direction as an axis and rotation around the X-direction as an axis.

The present disclosure is applicable to various purposes for projecting video using a plurality of projectors capable of moving a projection position of video.

What is claimed is:

1. A video projection method by a video projection system including a first projector, a second projector, and a controller that transmits video data to the first projector and the second projector, the video projection method comprising:
projecting, by the first projector, first projection video whose projection area where projection video is displayed by the first projector moves in a first region, the projecting being performed based on the video data transmitted from the controller;
projecting, by the second projector, second projection video onto a second region, the projecting being performed based on the video data transmitted from the controller; and
adjusting the video data of the first projection video or the video data of the second projection video in a superimposed region where projection area of the first projector and projection area of the second projector overlap.

2. The video projection method according to claim 1, wherein in the adjusting, the resolution of the first projection video is adjusted to match with resolution of the second projection video in the superimposed region.

3. The video projection method according to claim 1, wherein in the adjusting, the brightness of the first projection video is adjusted to match with brightness of the second projection video in the superimposed region.

4. The video projection method according to claim 1, wherein in the adjusting, brightness of a part of the second projection video overlapping the first projection video is set to 0%.

5. The video projection method according to claim 1, further comprising:
projecting, by the second projector, the second projection video whose projection area where projection video is displayed by the second projector in the second region.

6. The video projection method according to claim 5, further comprising:

controlling a projection angle of the second projector depending on a projection angle of the first projector during the projecting of the first projection video by the first projector.

7. The video projection method according to claim 5, further comprising:
changing a moving speed of the second projector depending on a moving speed of the first projector during the projecting of the first projection video by the first projector.

8. The video projection method according to claim 5, wherein
in the adjusting, in the superimposed region, positions, shapes, and sizes of the first projection video and the second projection video are adjusted to be matched, brightness of the first projection video is set higher at a position close to the first region and lower at a position close to the second region, and brightness of the second projection video is set lower at a position close to the first region and higher at a position close to the second region.

9. The video projection method according to claim 8, wherein in the adjusting, brightness of projection video formed by overlapping the first projection video and the second projection video is kept constant in the superimposed region.

10. The video projection method according to claim 8, wherein in the adjusting, positions, shapes, and sizes of the first projection video and the second projection video are matched by a projection transformation matrix.

11. The video projection method according to claim 1, further comprising:
adjusting at least one of resolution and brightness of the first projection video or the second projection video in a superimposed region where the first region and the second region overlap.

12. A video projection method by a projector having a mechanism for moving a projection position of projection video to be projected, the video projection method comprising moving a display position of a predetermined image in the projection video in a movement direction with respect to the projection video in response to a speed at which the projection position moves when the movement direction of the projection position of the projection video is reversed by reversing of a driving direction of the mechanism.

13. A video projection system comprising:
a first projector that projects first projection video whose projection area where projection video is displayed by the first projector moves in a first region;
a second projector that projects second projection video in a second region; and
a controller that transmits video data to the first projector and the second projector,
wherein the controller adjusts of the video data of the first projection video or the video data of the second projection video in a superimposed region where the projection area of the first projector and the projection area of the second projector overlap.

14. The video projection system according to claim 13, wherein
the second projector projects the second projection video whose projection where projection video is displayed by the second projector moves in the second region.

15. The video projection system according to claim 14, wherein
in the superimposed region, the controller adjusts, in the video data, positions, shapes, and sizes of the first projection video and the second projection video to match, and brightness of the first projection video is set higher at a position close to the first region and lower at a position close to the second region, and brightness of the second projection video is set lower at a position close to the first region and higher at a position close to the second region.

16. The video projection system according to claim 13, wherein the controller adjusts at least one of resolution and brightness of the video data of the first projection video in a superimposed region where the first region and the second region overlap.

\* \* \* \* \*